United States Patent [19]
Nagano et al.

[11] Patent Number: 6,075,600
[45] Date of Patent: Jun. 13, 2000

[54] SIGNAL FORMATION APPARATUS FOR USE IN INTERFERENCE MEASUREMENT

[75] Inventors: Shigenori Nagano; Makoto Fujino; Akira Takada; Nobuo Hori, all of Tokyo, Japan

[73] Assignee: Kabushiki Kaisha Topcon, Tokyo, Japan

[21] Appl. No.: 09/274,306

[22] Filed: Mar. 23, 1999

[30] Foreign Application Priority Data

Mar. 23, 1998 [JP] Japan .................................. 10-092192
Mar. 23, 1998 [JP] Japan .................................. 10-092205

[51] Int. Cl.$^7$ ....................................................... G01B 9/02
[52] U.S. Cl. ........................ 356/356; 356/345; 250/237 G
[58] Field of Search .................................. 356/345, 354, 356/356; 250/237 G

[56] References Cited

U.S. PATENT DOCUMENTS 5,883,714  3/1999  Jann et al. ............................... 356/357

FOREIGN PATENT DOCUMENTS 63-277923  11/1988  Japan .
3-279811  12/1991  Japan .

OTHER PUBLICATIONS

Oyo Buturi, "Integrated–optic Devices Using Diffraction Gratings," Japan Society of Applied Physics, vol. 61, No. 1, 1992, pp. 2–13.

Haruna et al., Laser beam lithographed micro–Fresnel lenses, Applied Optics, vol. 29, No. 34, Dec. 1, 1990, pp. 5120–5125.

*Primary Examiner*—Robert H. Kim
*Attorney, Agent, or Firm*—Foley & Lardner

[57] ABSTRACT

Provided is a signal formation apparatus for use in an interference measurement which is capable of achieving a simplicity of optical adjustments and a subminiature of the apparatus, as well as a reduction of an influence by a wavelength variation of a laser light to the utmost. A coherent light emitted from a light source section 1 is supplied to a light emission portion 3 via a connection section 2. The light emission portion 3 comprises a straight type incidence waveguide 32, a dividing waveguide 33, emission waveguides 34 and 35, and a phase modulation section 36, which are provided on an optical substrate 31. The light emission portion 3 performs a phase modulation for one of luminous fluxes and emits irradiation luminous fluxes while keeping the other luminous flux as it is. In an irradiation optical portion 4, these irradiation luminous fluxes are collimating and deflected, and irradiated onto a measurement spot of a scale section 5. In the scale section 5, the two luminous fluxes are diffracted into approximately the same direction and incident onto a light receiving portion 6. A light receiving portion 7 convert the received luminous flux to an electrical received signal, and a displacement of the scale section 5 can be obtained by a displacement measurement section 8, based on the received signal.

20 Claims, 17 Drawing Sheets

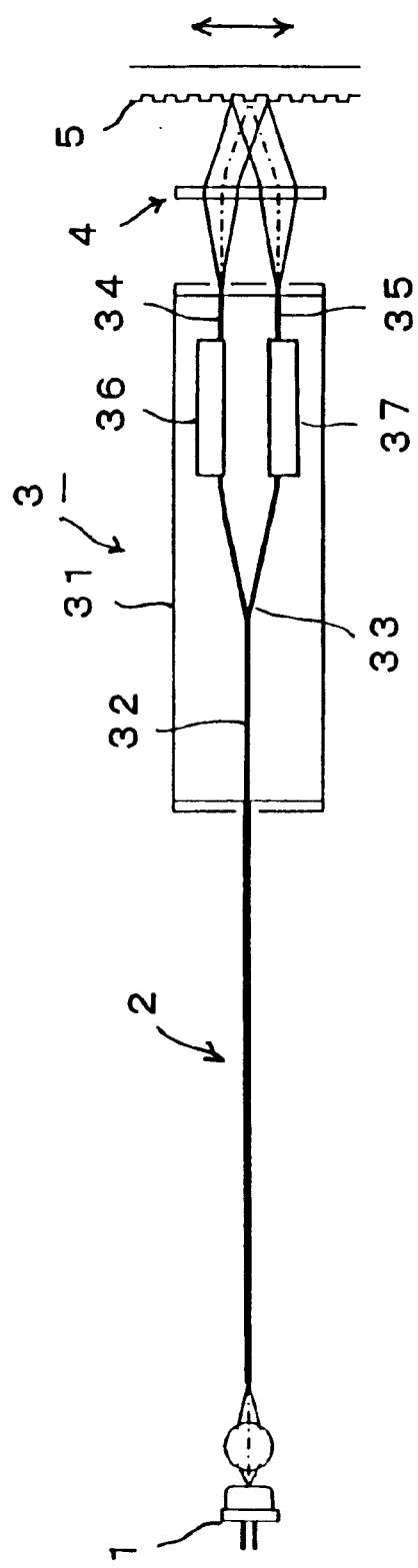
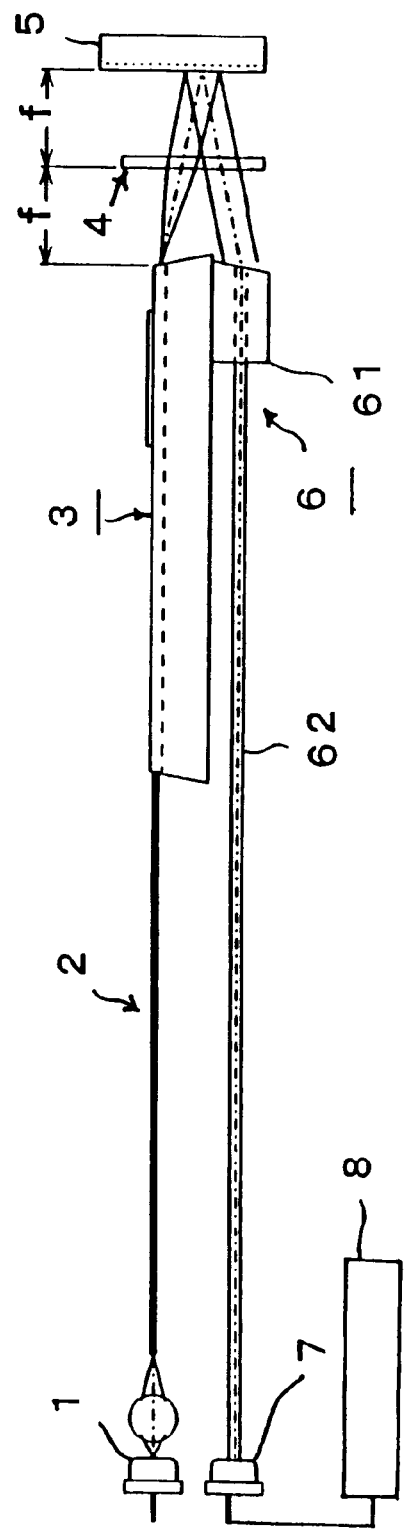
FIG. 1A
FIG. 1B

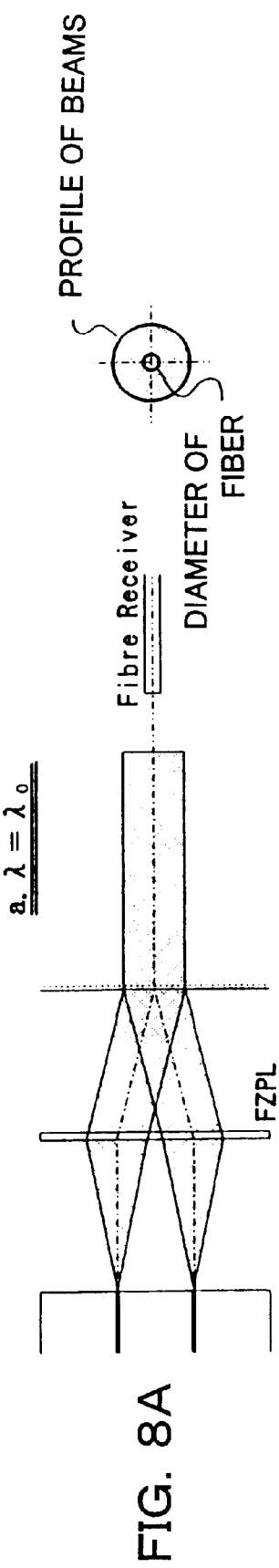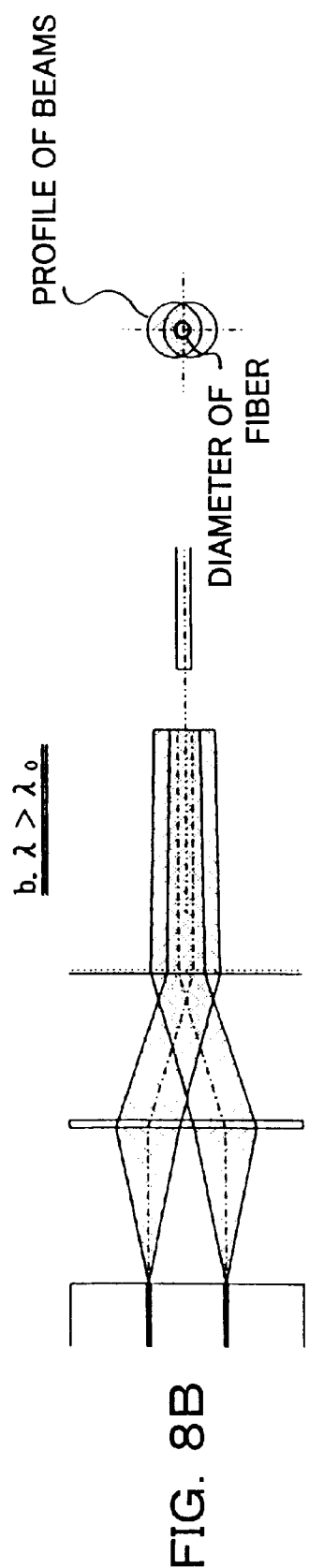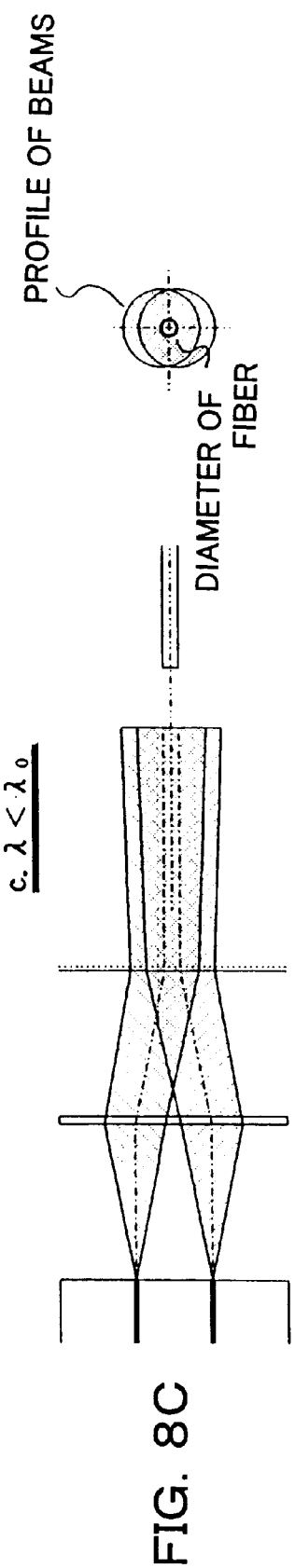

SIGNAL FORMATION APPARATUS FOR USE IN INTERFERENCE MEASUREMENT

BACKGROUND OF THE INVENTION

The present invention relates to a signal formation apparatus for use in an interference measurement, more particularly to a signal formation apparatus used for in interference measurement apparatus for measuring a displacement of a scale section.

A structure of a conventional interference measurement apparatus is illustrated in FIG. 17.

The conventional interference measurement apparatus (encoder) comprises a laser diode 101; a collimator lens 102; a deflection beam splitter 103; reflection members 104a and 104b; diffraction gratings 105a and 105b; a scale 106; a ¼ wave plate 107; a beam splitter 108; polarizing plates 109a and 109b; detectors 110a and 110b; and a reflection mirror 111.

A coherent light emitted from the laser diode 101 undergoes a collimation by the collimator lens 102, that is, the coherent light is converted to a parallel beam. This parallel beam is divided into a P polarized light in a transmission direction and a S deflected light in a reflection direction by the deflection beam splitter 103. The deflected light beams are irradiated perpendicularly onto the diffraction gratings 105a and 105b by the reflection members 104a and 104b. Diffracted lights LD1 and LD2 are irradiated onto a measurement diffraction grating 106A on the scale 6 from two directions. The lights LD1 and LD2 are diffracted and reflected by the diffraction grating 106A in the direction perpendicular to the diffraction grating 106A on the scale 16. The light LD1 and LD2 become ±m ordered re-diffracted lights LD1(m) and LD2(-m), respectively, thus travelling on the same optical path toward a detection optical portion. The re-diffracted lights are perpendicularly polarized with each other and passes through the ¼ wave plate 107 via the reflection mirror 111, and become circularly polarized lights, respectively. The circularly polarized lights are divided so as to travel along two optical paths by the beam splitter 108, and respectively subjected to a photoelectric detection by the detectors 110a and 110b after passing through the polarization plates 109a and 109b.

Next, a structure of a conventional optical waveguide laser Doppler velocimeter device will be shown in FIGS. 18A and 18B.

As shown in FIG. 18A, in a optical substrate 200, provided are an optical waveguide 201 for receiving an inputted light; a dividing section 202; a frequency shifter 203; an optical waveguide 204 for outputting an outputted light; and a block 205. Moreover, in the optical substrate 200, an optical waveguide device 206 and a micro Fresnel lens 207 are respectively provided in combination with each other. An array composed of three micro Fresnel lenses is fixed to the end face of the block 205. In FIG. 18B, the structure of the micro Fresnel lens array is illustrated.

SUMMARY OF THE INVENTION

However, because the conventional interference measurement apparatus needs many individual parts as described above, it inherently involves a limitation to its downsize. Moreover, many parts are built in the conventional interference measurement apparatus, so that adjustments of optical arrangements for these parts are difficult.

Furthermore, sufficient considerations for coping with a wavelength variation in a laser as a light source have not been made. In the above-described conventional laser Doppler velocimeter device, countermeasures for the wavelength variation and a stability of the amount of a received light are not taken. Since this apparatus is a Doppler velocity measurement device, it is rather said that such a countermeasure is not needed so much.

Moreover, the conventional signal formation apparatus for use in an interference measurement using an optical waveguide has a limitation to arrangements of components constituting a light emission portion and a light receiving portion.

In consideration of the foregoing points, the object of the present invention is to achieve a small number of optical parts to reduce a reduction in size, as well as a simplicity and easiness of optical adjustments.

Since a subminiature and rigid interference optical system can be achieved by the present invention, another object of this invention is to provide a high precision and cheap signal formation apparatus for use in an interference measurement which is capable of stabilizing an output signal.

Further object of the present invention is to reduce an influence by a wavelength variation of a laser light to the utmost, thereby achieving its stability.

Yet another object of the present invention is to adopt a structure in which an irradiation luminous flux emitted from an light emission portion which is arranged on one surface of an optical substrate is irradiated to a scale section at a predetermined angle, and a diffracted light which is reflected from the scale section is received by a light receiving portion arranged on the other surface of the optical substrate, thereby making it easy to dispose and adjust components constituting the structure.

Still further object of the present invention is to provide a signal formation apparatus for use in an interference measurement which exhibits a strong resistance to a variation in the amount of received light, uses only one detector, and can discriminate the amount of displacements depending on a displacement direction.

An additional object of the present invention is to achieve both functions of light collection and deflection with one device in the case of usage of a zone plate lens (ZPL), thereby simplifying an installation and reducing a size of the whole of a module.

According to the first solving means of the present invention, provided is a signal formation apparatus for use in an interference measurement which comprising:

a light emission portion for forming at least two irradiation luminous fluxes, the light emission portion having an incidence waveguide for guiding a coherent irradiation luminous flux from a light source section; a dividing waveguide for dividing the luminous flux from said incidence waveguide into at least two luminous fluxes; at least two emission waveguides divided by said dividing waveguide; and a phase modulator for performing a phase modulation for a luminous flux of at least one of said emission waveguides, said incidence waveguide, said dividing waveguide, said emission waveguides, and said phase modulator being formed on one surface of an optical substrate; and a light receiving portion for receiving a diffracted luminous flux obtained by diffracting and reflecting at least the two luminous fluxes by a scale section, the light receiving portion being formed on the other surface of said optical substrate.

According to the second solving means of the present invention, provided is a signal formation apparatus for use in an interference measurement comprising:

a light emission portion for forming at least two irradiation luminous fluxes, the light emission portion having an incidence waveguide for guiding a coherent irradiation luminous flux from a light source section; a dividing waveguide for dividing the luminous flux from said incidence waveguide into at least two luminous fluxes; at least two emission waveguides divided by said dividing waveguide; and a phase modulator for performing a phase modulation for a luminous flux of at least one of said emission waveguides, said incidence waveguide, said dividing waveguide, said emission waveguides, and said phase modulator being formed on a surface of an optical substrate;

an irradiation optical portion having a diffraction type lens such as a Fresnel zone plate, said irradiation optical portion irradiating at least two irradiation luminous fluxes irradiated from said light emission portion to a measurement spot;

a scale section movably disposed relative to said light emission portion, said scale section diffracting at least the two luminous fluxes irradiated by said irradiation optical portion by a diffraction grating formed on a surface thereof, thereby forming a diffracted luminous flux approximately in the same direction as that of the irradiated luminous flux;

a light receiving portion for receiving the diffracted luminous flux diffracted by said scale section; and a light receiving section for receiving the diffracted luminous flux received by said light receiving portion, thereby forming a light receiving signal.

According to the third solving means of the present invention, provided is a signal formation apparatus for use in an interference measurement comprising:

a light emission portion for forming at least two irradiation luminous fluxes, the light emission portion having an incidence waveguide for guiding a coherent irradiation luminous flux from a light source section; a dividing waveguide for dividing the luminous flux from said incidence waveguide into at least two luminous fluxes; at least two emission waveguides divided by said dividing waveguide; and a phase modulator for performing a phase modulation for a luminous flux of at least one of said emission waveguides, said incidence waveguide, said dividing waveguide, said emission waveguides, and said phase modulator being formed on a surface of an optical substrate; and a light receiving portion for receiving a diffracted luminous flux, said diffracted luminous flux being obtained by diffracting, reflecting or transmitting at least the two irradiation luminous fluxes irradiated by said light emission portion in a movable scale section having a diffraction grating.

BRIEF DESCRIPTION OF THE DRAWINGS

For a more complete understanding of the present invention and the advantages thereof, reference is now made to the following description taken in conjunction with the accompanying drawings.

In FIGS. 1A and 1B, a structure of a signal formation apparatus for use in an interference measurement according to the present invention is illustrated.

In FIGS. 8A to 8C, an explanatory view concerning a stability against variations in a wave length of the present invention is illustrated.

DETAILED DESCRIPTION OF THE PREFERRED EMBODIMENTS (1) Signal Formation Apparatus For Use In Interference Measurement In FIGS. 1A and 1B, a structure of a signal formation apparatus for use in an interference measurement is illustrated. In FIG. 1A, a plan view of the signal formation apparatus for use in an interference measurement is illustrated, and in FIG. 1B, a side view thereof is illustrated.

Figure 2A:
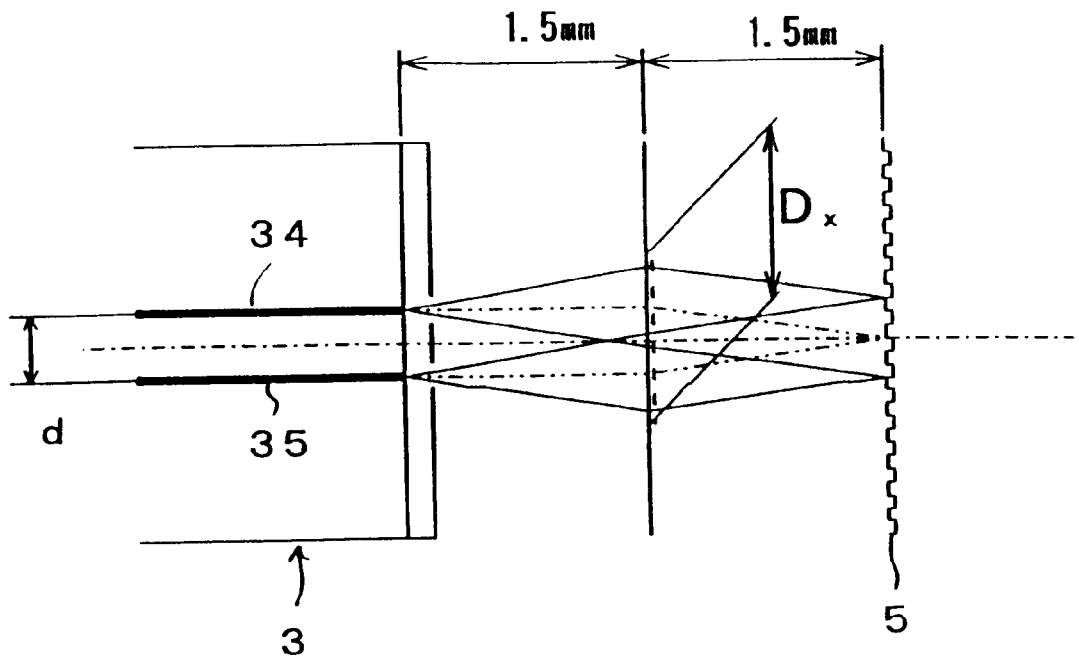
In FIGS. 2A and 2B, an explanatory plan view concerning a design of a focal length of a zone plate lens (ZPL) is illustrated.

The signal formation apparatus for use in an interference measurement comprises a light source section 1; a connection section 2; a light emission portion 3; an irradiation optical portion 4; a scale section 5; a light receiving portion 7; and a displacement measurement section 8.

The light source section 1 is constituted, for example, by a light emission device for outputting a coherent light such as a laser diode. The connection section 2 is constituted, for example, by a lens, a polarization maintaining fiber or the like. The connection section 2 receives a coherent light from the light source section 1 and supplies a laser light emitted from the light source section 1 to the light emission portion 3. When as the light source section 1, a laser for emitting a random polarized light is employed, it is also possible to make the laser light after suitably converting the laser light to a linearly polarized light having a polarization orientation in either a X or Y-direction, by providing a polarizer or the like.

The light emission portion 3 is formed on an optical substrate 31 exhibiting an electro-optical effect, which is formed of a lithium niobate crystal substrate, a lithium tantalate crystal substrate or the like. On the optical substrate 1, one straight incidence waveguide 32 of X-cutting and Z-propagation type is formed for example, and the waveguide 32 is divided into emission waveguides 34 and 35 by the dividing waveguide 33. Near the emission waveguides 34 and 35, a pair of electrodes for modulating a refractive index in the Y-direction are arranged, and phase modulators 36 and 37 are formed in the electrodes, respectively. A sine wave signal of a predetermined frequency and a phase modulation signal having approximately the same amplitude and an opposite sign are applied to the electrodes of the phase modulators 36 and 37, respectively, and thus the phase modulators 36 and 37 change the phase of the incident luminous flux. As an example of the phase modulation signal, $+\sin(2\pi f_M t)$, $-\sin(2\pi f_M t)$ or the like are used.

The irradiation optical portion 4 is constituted by a diffraction type lens such as a Fresnel zone plate, a grating lens, a diffraction type zone plate (ZPL) or the like. A diffraction grating is formed either at the position on the surface of the scale section 5 onto which a light is irradiated or on the reverse surface of the scale section 5.

The light receiving portion 6 comprises a block 61 constituted by either a socket or a ferrule, formed of such as glass and plastic, and an optical fiber 62 such as a multi-mode fiber. The light receiving portion 7 is constituted by a light receiving device such as a photodiode. Noted that when the amount of light is insufficient, a collection lens may be provided in front of the light receiving portion 7. The displacement measurement section 8 performs a processing for obtaining the displacement of the scale 5 shown by the arrow, based on an interference light received.

Next, an operation of the foregoing signal formation apparatus for use in an interference measurement will be described. First, a coherent light emitted from the light source section 1 travels through the connection section 2 so that its polarization plane is conserved. Thus, the coherent light is supplied to the light emission portion 3. In the light emission portion 3, one luminous flux is subjected to the phase modulation by applying it a sine wave signal of a predetermined frequency and the other luminous flux is subjected to the phase modulation by applying it a phase modulation signal having approximately the same amplitude as the sine wave and the opposite sign to it. Thus, at least two luminous fluxes are emitted from the light emission portion 3. In the irradiation optical portion 4, these irradiation luminous fluxes are collimating and deflected, and then irradiated onto the measurement spot of the scale section 5. In the scale section 5, at least two irradiation luminous fluxes are diffracted approximately in the same direction, and these two diffracted luminous fluxes are collectively incident into the light receiving section 6. In the light receiving portion 6, the diffracted luminous fluxes are received and guided to the light receiving portion 7. The light received section 7 receives the diffracted luminous fluxes and converts them to electric received signals. The displacement measurement section 8 analyzes the components of the received signals received by the light receiving portion 7, and obtains the displacement of the scale section 5.

(2) Design Conditions of Diffraction Lens Such as Fresnel Zone Plate

Next, as an example of the diffraction type lens (diffraction type zone plate lens), design conditions of an obliquely incident off-axis type Fresnel zone plate (FZP) will be described.

Figure 2B:
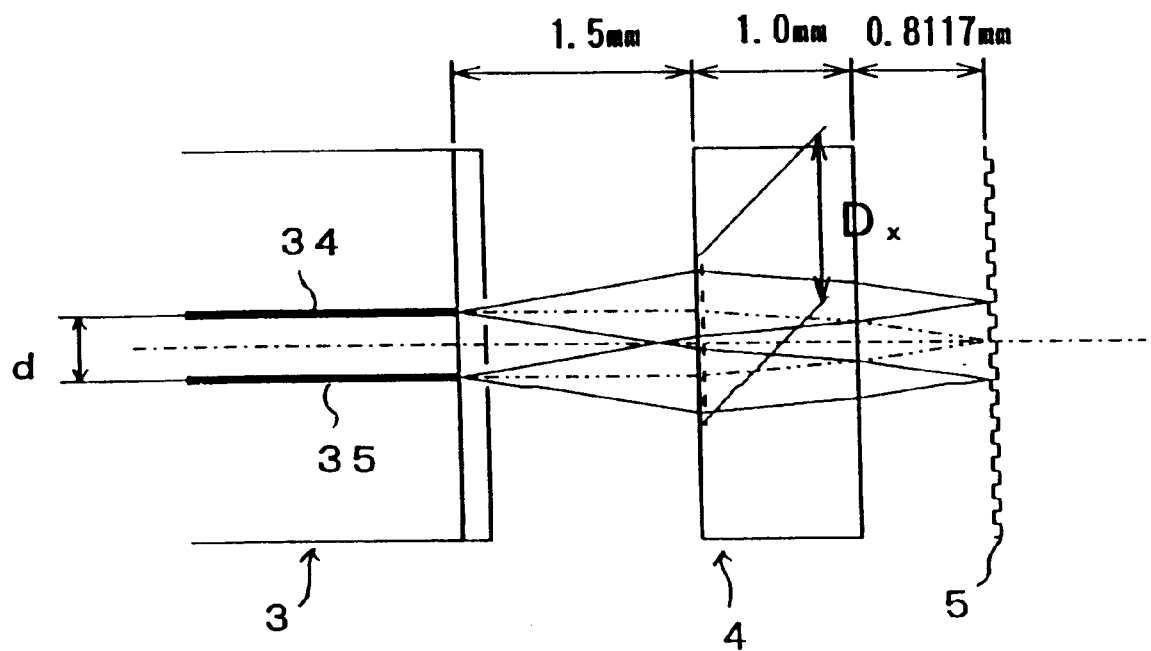

In FIGS. 2A and 2B, a plan view concerning a focal length design of the FZP is illustrated. In FIG. 2A, an explanatory view of an air length conversion (air pass), and in FIG. 2B, an explanatory view taking the thickness of the FZP into consideration is illustrated.

The setting of the focal length of the FZP is carried out in the following manner. First, the a wavelength of the laser of the light source section 1 is called $\lambda_0$; an interval between the two emission waveguides 34 and 35 of the optical substrate, d; a grating pitch of the scale section 5 as a linear encoder, p; and a diffraction angle of a principal beam of light by the scale section 5, $\theta$. In this case, the condition that ±1 order diffracted light reflected from the scale section 5 is vertically reflected onto the light receiving portion 6 is as follows.

$$\sin\theta = \pm\lambda_0/P$$

The focal length $f_0$ of the FZP is decided as follows.

$$f_0 = (d2)/\tan\theta$$

Here, for example, when it is assumed that $\lambda_0$ is 830 nm, p is 10 $\mu$m, d is 250 $\mu$m, $\theta$ is 4.76° and $f_0$=1.5 mm. The dimension of the optical arrangement is illustrated in FIG. 2B when the thickness of a quartz substrate (for example, refractive index n=1.46) for forming the FZP is set to 1.0 mm.

Next, descriptions for setting an effective diameter (minimum value) of the FZP will be made. When an effective luminous flux divergence angle (numerical aperture) NA of the emission luminous flux from the waveguide is set to $\alpha$, the effective diameter of the FZP is obtained as follows. Specifically, an effective diameter Dx in x-direction (y=0 section):

$$Dx = 2f_0 \tan\alpha + d$$

an effective diameter Dy in y-direction (x=0 section):

$$Dy = 2f_0 \tan\alpha$$

Here, when NA is set to 0.1, that is, $\alpha$ is set to 5.74°, Dx is 0.55 mm and Dy is 0.3 mm.

Figure 3A:
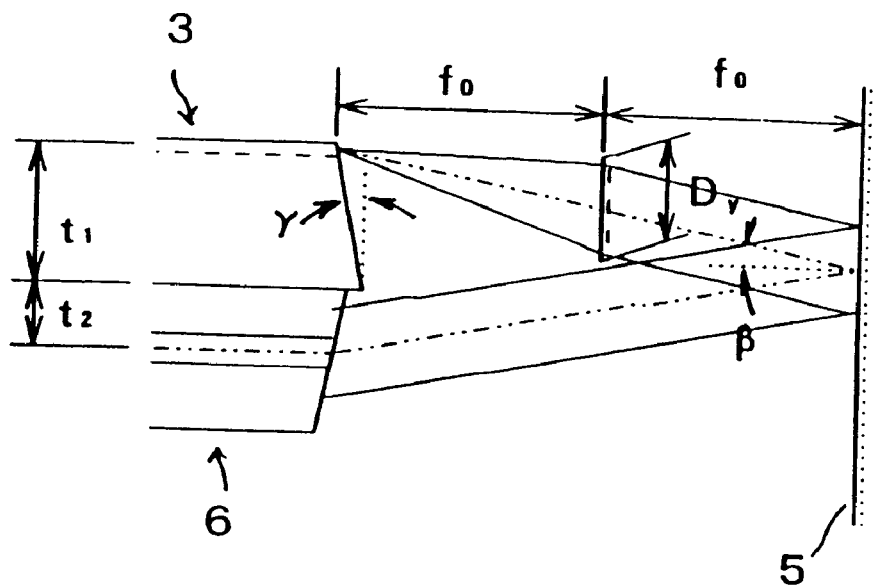
In FIGS. 3A and 3B, an explanatory side view concerning the design of the focal length of the zone plate lens (ZPL) is illustrated.
Figure 3B:
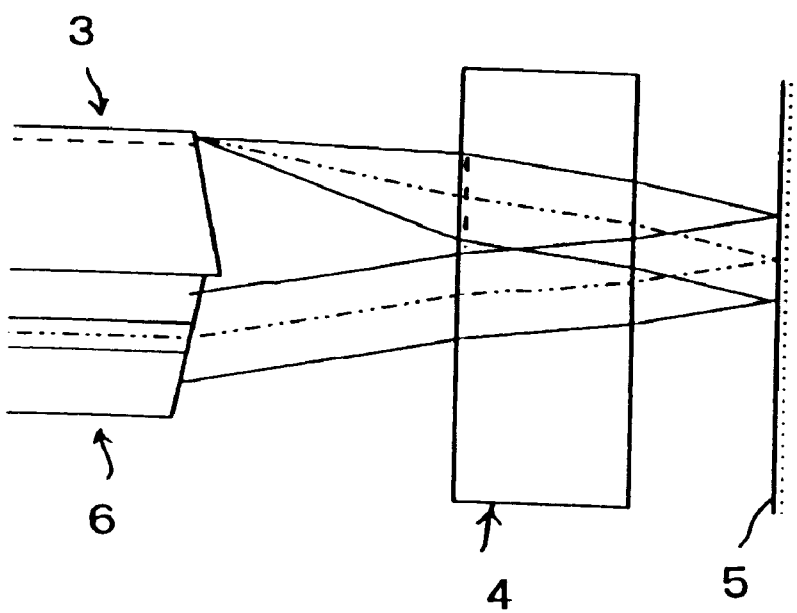

Next, the setting of the emission angle of the emitted principal beam of light from the waveguides 34 and 35 as well as taking of the emitted principal beam of light into the light receiving portion will be described. In FIGS. 3A and 3B, an explanatory side view for designing the focal length of the FZP is illustrated. In FIG. 3A, an explanatory view of the air length conversion (air pass) is illustrated, and in FIG. 3B, an explanatory view in consideration for the thickness of the FZP is illustrated.

When the end face of the optical substrate 31 is subjected to a vertical polishing, a light reflected on the end surface of the optical substrate 31 returns to the light source section 1, so that the wavelength and output of the semiconductor laser will be made to be unstable. Accordingly, in the present invention, in order to remove such a returning light, an oblique polishing is performed for the emission side end face of the light emission portion 3, and the irradiation luminous flux is suitably irradiated to the measurement spot of the scale section 5. On the other hand, by processing the incidence side end face of the light receiving portion 6 by the oblique polishing, the diffracted luminous flux from the scale section 5 is suitable incident to the light receiving portion 6.

Specifically, the optical substrate 31 having the waveguides 34 and of the light emission portion 3 has an end face obliquely formed from the surface thereof toward the center relative to a plane perpendicular to the emission direction of the luminous flux, which projects toward the scale section 5. Also the block 61 having the optical fiber 62 of the light receiving portion 6 in the internal hole has an end face obliquely formed from the surface thereof toward the center relative to a plane perpendicular to the emission direction of the luminous flux, which projects toward the scale section 5. Thus, the irradiation luminous flux which was refracted on the emission side end surface of the emission waveguides 34 and 35 is reflected and diffracted by the scale section 5. Thereafter, the irradiation luminous flux is refracted on the emission end surface of the light receiving portion 6, and incident into the optical fiber 62.

In the present invention, by setting the emission angle of the emitted principal beam of light from the waveguide of the optical substrate 31, the polishing angle of the end face of the optical substrate 31 is set so that the reflection light from the scale section 5 as a linear encoder does not pass through an effective portion of the FZP.

Figure 4:
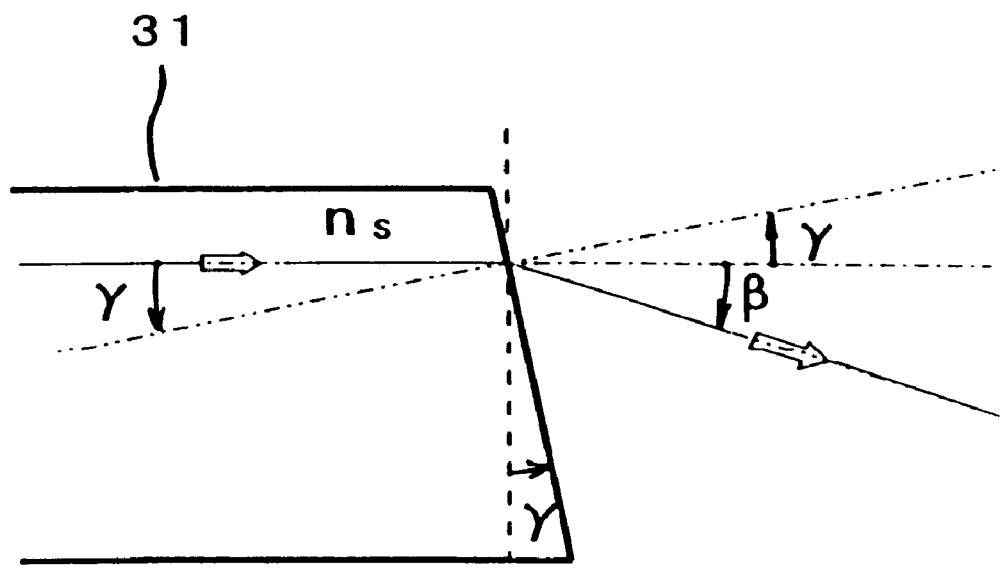
In FIG. 4, an explanatory view of a polishing angle of an optical substrate is illustrated.

Next, the setting of the polishing angle will be described. In FIG. 4, an explanatory view of the polishing angle of the optical substrate is illustrated.

First, when the emission angle is called β; the thickness of the light emission side of the optical substrate 31, $t_1$; and the thickness of the light receiving side, $t_2$, the following equation is the condition from FIG. 3A. Specifically, $$2 \cdot f_0 \tan \beta = (t_1 + t_2)/2$$

$$f_0 \tan \beta \geq Dy/2$$

After the light emission angle β satisfying such a conditions is obtained, the polishing angle γ of the end face of the optical substrate is determined as follows. Specifically, $$n_s \sin \gamma = \sin (\beta + \gamma)$$

($n_s$: a refractive index of the optical substrate 31) For example, when the emission angle β and the polishing angle γ are obtained from $n_s$=2.2 based on t1=1.0 mm and t2=0.4 mm, β is 13° and γ is 10°.

(3) Another Embodiment of the Light receiving portion

Figure 5A:
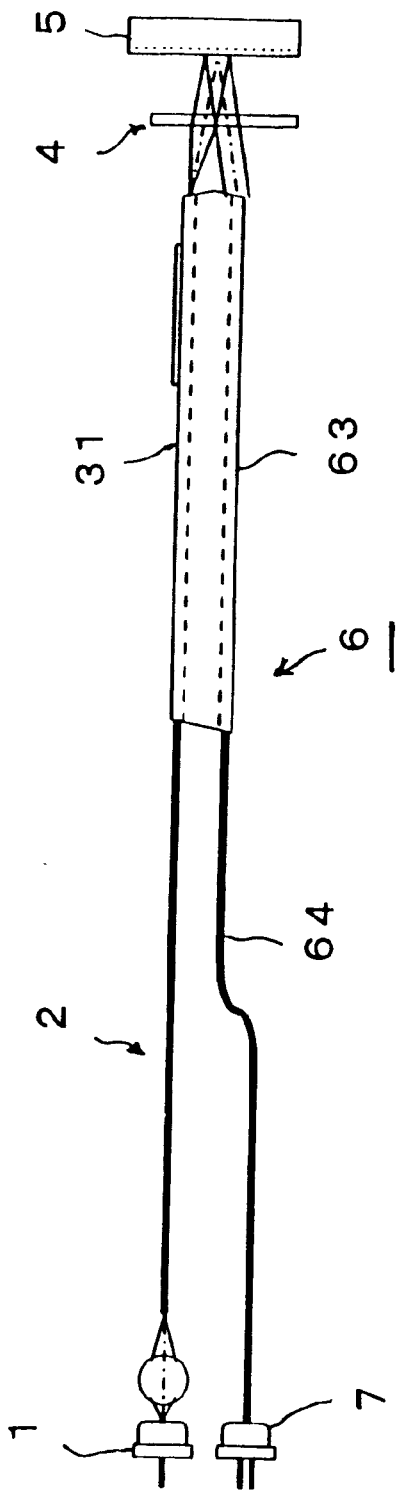
In FIGS. 5A and 5B, a structure of a second embodiment of a signal formation apparatus for use in an interference measurement is illustrated.
Figure 5B:
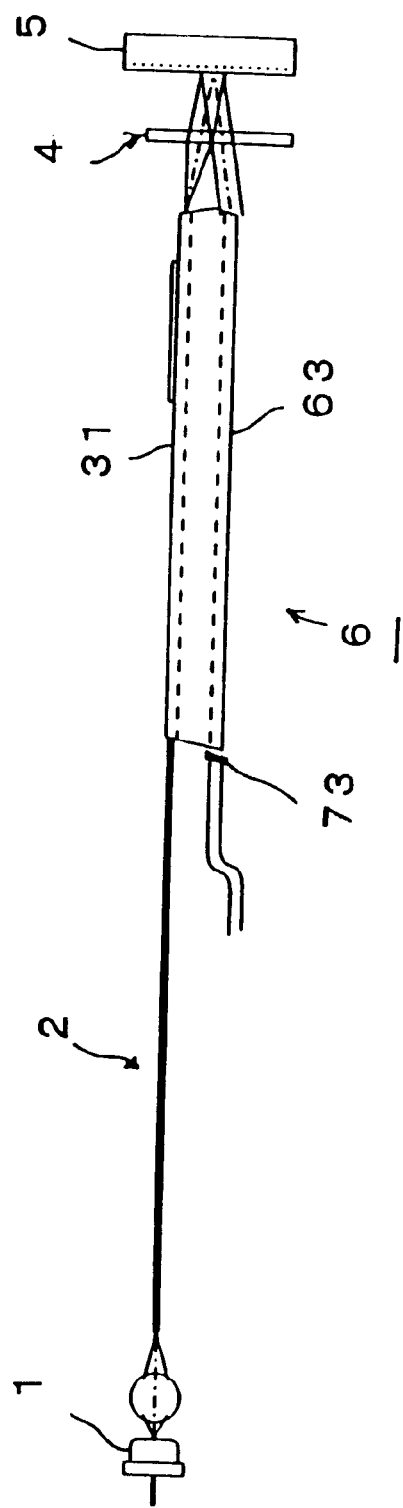

In FIGS. 5A and 5B, a structure of a second embodiment of a signal formation apparatus for use in an interference measurement is illustrated.

In the first embodiment, the multi-mode fiber is fitted to the reverse surface of the optical substrate 31. In the second embodiment shown in FIG. 5A, a waveguide 63 such as a three dimensional waveguide, for example, is formed on the reverse surface of the optical substrate 31, as the light receiving portion. This waveguide 31 has an end face obliquely polished so that the diffracted luminous flux received from the scale section 5 is easy to be incident into the waveguide. The optical fiber 62 is connected to the waveguide 63 formed on the optical substrate 31, and communicated with the light receiving portion 7.

In FIG. 5B, a structure of a modification of the second embodiment of the image formation apparatus for use in an interference measurement of the present invention is illustrated. In this modification structure of the second embodiments, the light receiving device 73 is directly connected to the end face of the optical substrate 31 which is located on the light emission side of the waveguide 63 formed in the optical substrate 31. At this time the light receiving device 73 such as a photodiode may be formed integrally with the optical substrate 31.

Figures 6A, 6B:
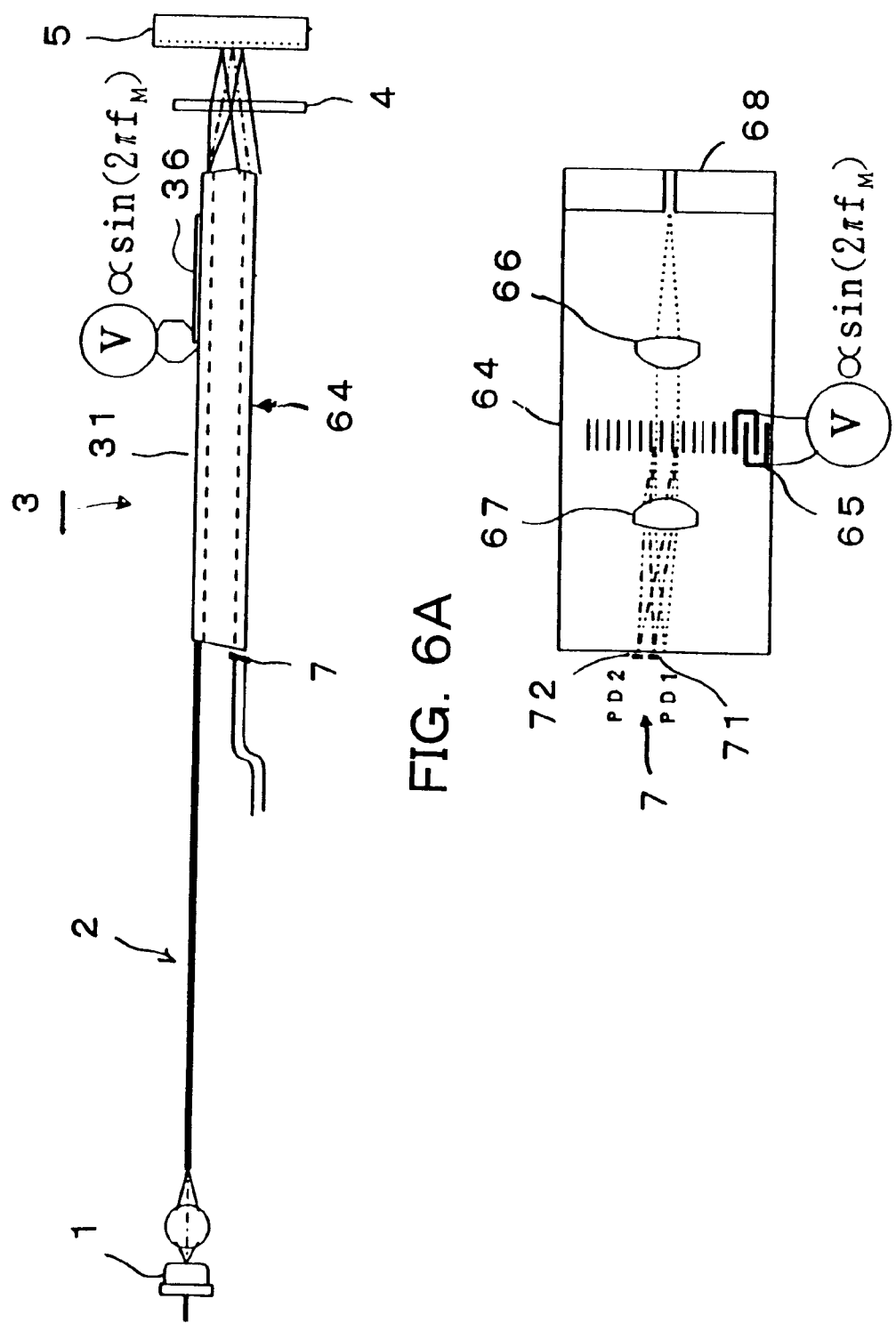
In FIGS. 6A and 6B, a structure of a third embodiment of a signal formation apparatus for use in a interference measurement is illustrated.

In FIGS. 6A and 6B, a structure of a third embodiment of a signal formation apparatus for use in an interference apparatus of the present invention is illustrated.

In the third embodiment, as the light receiving portion the optical spectrum analyzer 64 having a cross finger electrode (IDT) is formed on the reverse surface of the optical substrate 31. In this embodiment, by arranging such a device, an optical integration is achieved up to a part of signal processings. Such an optical integration can be made by adopting the phase modulation method.

The light receiving portion composed of the optical spectrum analyzer comprises the cross finger electrode (IDT) 65; a two dimensional device having the two dimensional waveguide lenses 66 and 67 and so on; and the three dimensional device 68. Moreover, as the light receiving portion 7, the first and second light receiving devices 71 and 72 are provided. These are formed integrally with the end face of the optical substrate 31 or alternatively directly connected thereto. Noted that these may be connected to the end face of the optical substrate 31 by an optical fiber 62.

The diffracted luminous flux received from the scale section 5 is incident into the three dimensional waveguide device 68. At this time, for easiness of the incidence of the diffracted luminous flux to the three dimensional waveguide device 68, the end face of the three dimensional waveguide device 78 is polished obliquely as described above. A signal similar to the phase modulation frequency $f_M$ applied to the phase modulators 36 and 37 of the light receiving portion 3 is applied to the cross finger electrode 65, so that a surface acoustic wave (SAW) is produced. The diffracted luminous flux travels through the two dimensional waveguide lens 67, and is diffracted by the surface acoustic wave formed by the cross finger electrode 65. Moreover, the component of the phase modulation frequency $f_M$ is received by the first light receiving device 71 through the two dimensional waveguide lens 67, and the $2f_M$ component twice the phase modulation frequency $f_M$ is received by the second light receiving device 72.

Figure 7A:
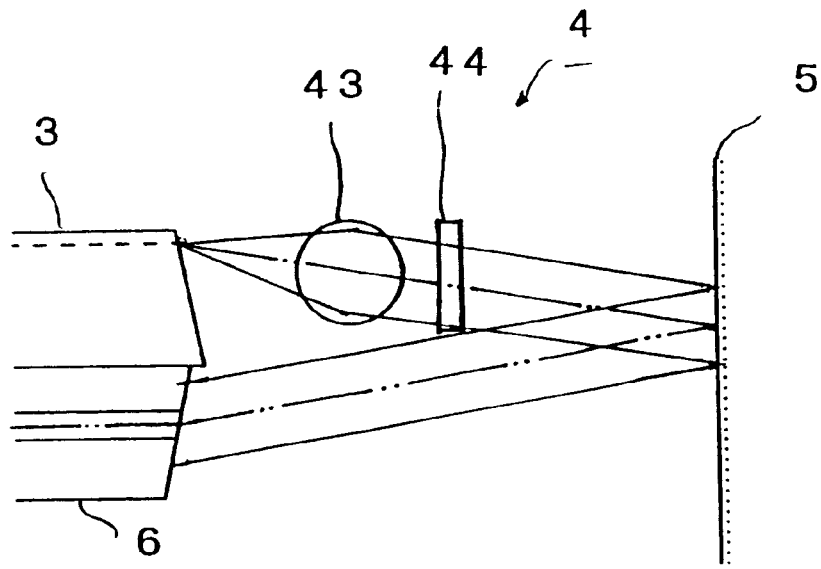
In FIGS. 7A and 7B, another structure of an irradiation optical portion is illustrated.
Figure 7B:
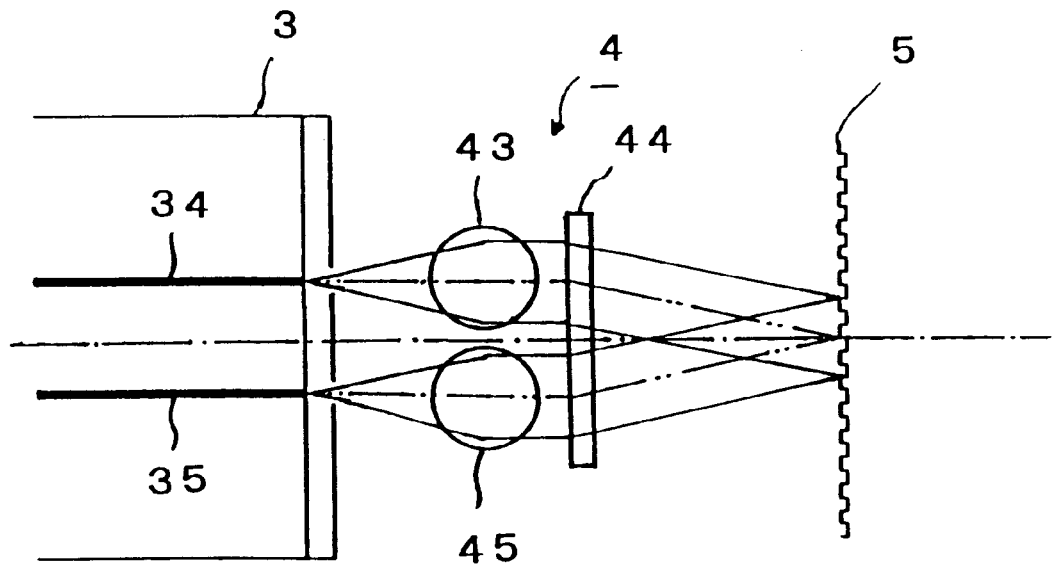

In FIGS. 7A and 7B, another structure of the irradiation optical portion is illustrated.

This structure illustrated in FIGS. 7A and 7B uses a ball lenses 43 and 45 and a diffraction grating 44 instead of the foregoing ZFP. The ball lenses 43 and 45 are provided so as to guide parallel beams of light to the irradiation waveguides 34 and 35 of the light emission portion 3. The generated irradiation luminous flux is irradiated onto the measurement spot of the scale section 5 by the diffraction grating 44, and reflected and diffracted. This luminous flux is incident onto the light receiving portion 6. Noted that other well known lenses may be employed instead of the ball lens.

(4) Stability against Wavelength Variation In FIGS. 8A to 8C, an explanatory view concerning a stability of the wavelength variation of the present invention is illustrated. Although the description of this stability is made using an example of a transmission type, the same is true for a reflection type. In FIGS. 8A and 8C, the principal beam of light is shown with the dash line.

In FIG. 8A, the state is illustrated, where the wavelength γ is equal to the setting reference wavelength $\gamma_0$. In this case, the principal beams of light of the two luminous fluxes diffracted by the scale section 5 are superposed, and emitted from the scale section 5. The superposed principal beams of light emitted from the scale section 5 are incident into either the fiber or the waveguide of the light receiving portion.

Next, in FIG. 8B, the state is illustrated, where the wavelength γ is larger than the setting reference wavelength $\gamma_0$. In this case, the two diffracted luminous fluxes are somewhat converged, and though the principal beams of light of two luminous fluxes are slightly shifted from each other, they are vertically emitted from the scale section 5 and made to be parallel. Then, the superposed portion in a section luminous flux is made to be incident into either the optical fiber or the waveguide of the light receiving portion.

Furthermore, in FIG. 8C, the state is illustrated, where the wavelength γ is smaller than the setting reference wavelength $γ_0$. In this case, the two diffracted luminous fluxes are somewhat diverged, and though the principal beams of light of two luminous fluxes are slightly shifted from each other, they are vertically emitted from the scale section 5 and made to be parallel. Then, similarly the superposed portion in a section luminous flux is made to be incident into either the optical fiber or the waveguide of the light receiving portion.

As described above, even if the diffraction angle varies due to the variation of the wavelength of the laser beam of the light source section 1, the receiving section 7 and the light receiving portion 6 can receive the part of the common luminous flux through the optical fiber. For this reason, the amount of the received light and the efficiency do not vary due variation of the wavelength, thereby achieving an excellent stability.

(5) Detailed Description of the Device

Figure 9:
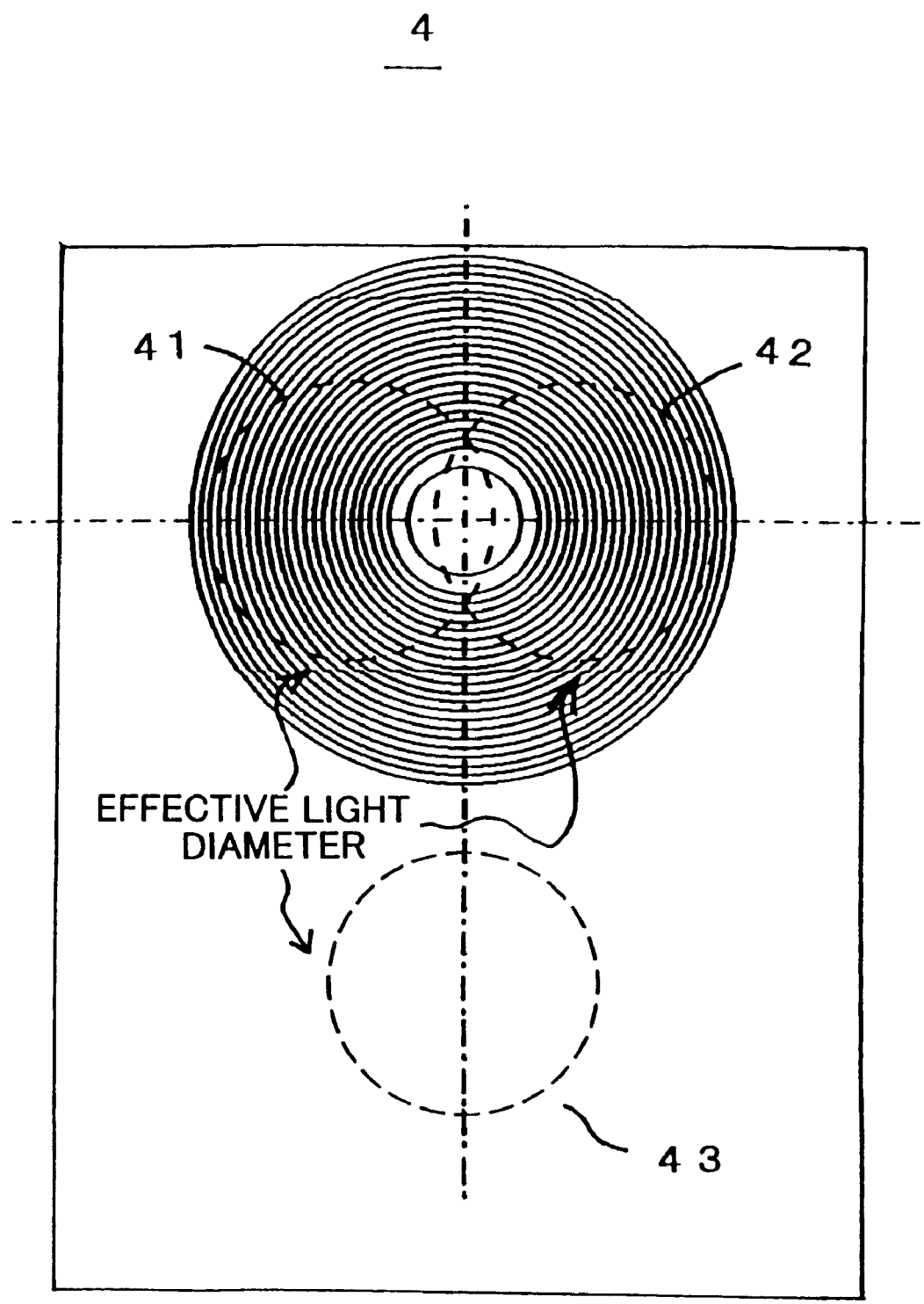
In FIG. 9, an explanatory view of a Fresnel zone plate mainly constituting the irradiation optical portion is illustrated.

First, the zone plate lens (ZPL) will be described. In FIG. 9, an explanatory view of a Fresnel zone plate principally constituting the irradiation optical portion is illustrated.

The principal beams of light of the two luminous fluxes emitted from the emission waveguides 34 and 35 of the light emission portion 3 passes through the portion of the effective light diameters 41 and 42 not the center of the ZPL. Moreover, the pattern shape of the ZPL may be elliptic extending in the lateral direction, not circular. In this case, the thickness in the longitudinal direction can be lessened.

The diffraction type ZPL can be manufactured from a variety of steps such as (1) a precision design step of a stigmatic type Computer Generated Hologram (CGH) using a computer, (2) a manufacturing step of ultraprecise original plate using an electron beam drawing apparatus, and (3) transfer-ring/working step using a photolithography. As described above, in the present invention, the diffraction type zone plate lens (ZPL) is particularly used in the part of the effective diameter of the light projection side laser beam, as a collimator lens for use in projecting a light, whereby a stigmatic lens of a short focal length, which is subminiature and an obliquely incidence off-axis type, can be easily manufactured. Moreover, the manufacturing is made to be possible by the flat plate glass, and manufacturing can be possible so that variations of the focal length and decentering are almost produced.

The diffracted luminous flux reflected from the scale section passes through the portion 43 where the ZPL is not formed on the flat plate glass. Noted that in the portion 43 though which the diffracted luminous flux passes, the flat plane glass may appropriately be cut, or the size of the flat plate glass may be minimized so that the flat plate glass itself does not exist in the portion 43.

Next, in FIGS. 10A to 10D, an example of the manufacturing steps of the light emission portion will be described.

Figure 10A:
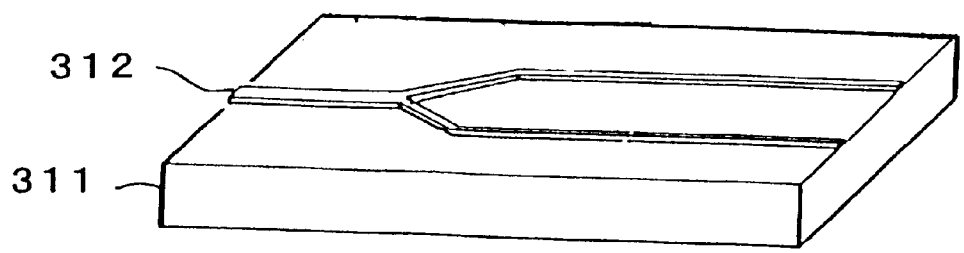
In FIGS. 10A to 10D, manufacturing steps of a light emission portion are illustrated.
Figure 10B:
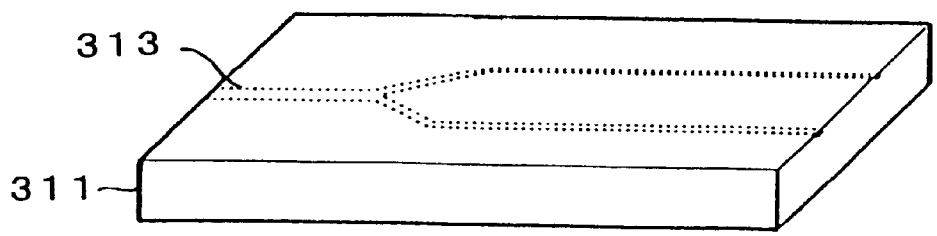
Figure 10C:
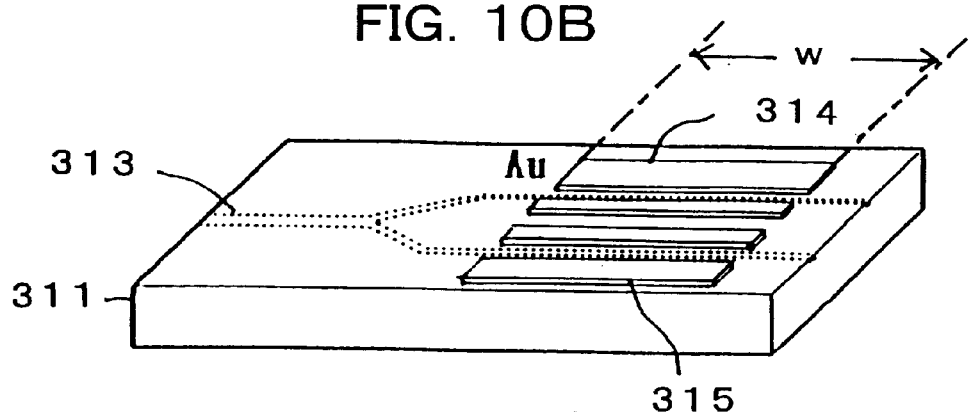

First, as shown in FIG. 10A, using a photolithography technology, a metal 312, for example, Ti, is deposited to a desired waveguide pattern shape on the surface of the single crystal substrate 311 formed of, for example, $LiNbO_3$ or $LiTaO_3$. Subsequently, as shown in FIG. 10B, by heating this single crystal substrate 311 in an electrical furnace or the like, the metal 312 is diffused into the substrate 311. As a result, the pattern-shaped buried type waveguide 313 is formed. In the case where the light passing through the buried type waveguide is modulated like the phase modulation method, after the waveguide 313 is formed, the light controlling electrodes 314 and 315 can be formed in a desired position, as shown in FIG. 10C. As a material of the light controlling electrodes 314 and 315, a metallic material exhibiting a good electric conductivity is used, and, for example, Au exhibiting stability depending on no passage of time is used by evaporating it.

Figure 10D:
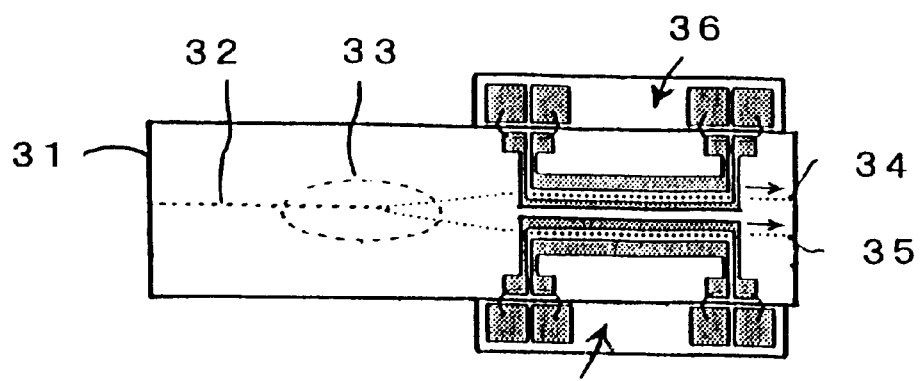

Thus, as shown in FIG. 10D, formed is the incidence waveguide 32 into which the coherent light from the light source section 1 is incident; at least two emission waveguides 34 and 35 for emitting the light; and the dividing waveguide 33 for dividing the light on the incidence waveguide 32 into at least two emission waveguides 34 and 35. Moreover, the phase modulators 36 and 37 for modulating at least two luminous fluxes in the emission waveguides 34 and 35, which were divided in the dividing waveguide 33, can be formed.

Figure 11A:
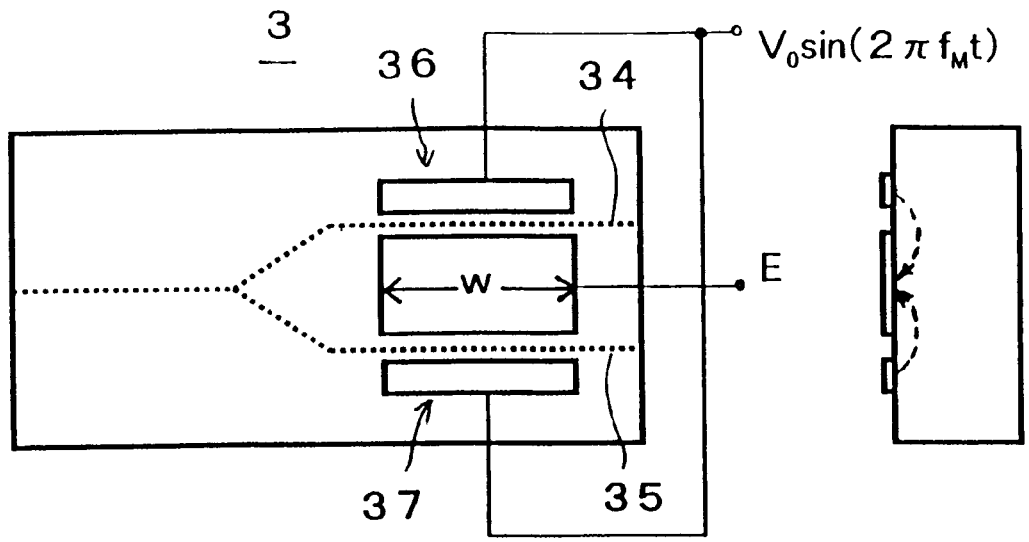
In FIGS. 11A and 11B, a structure of a modification example of the light emission portion is illustrated.
Figure 11B:
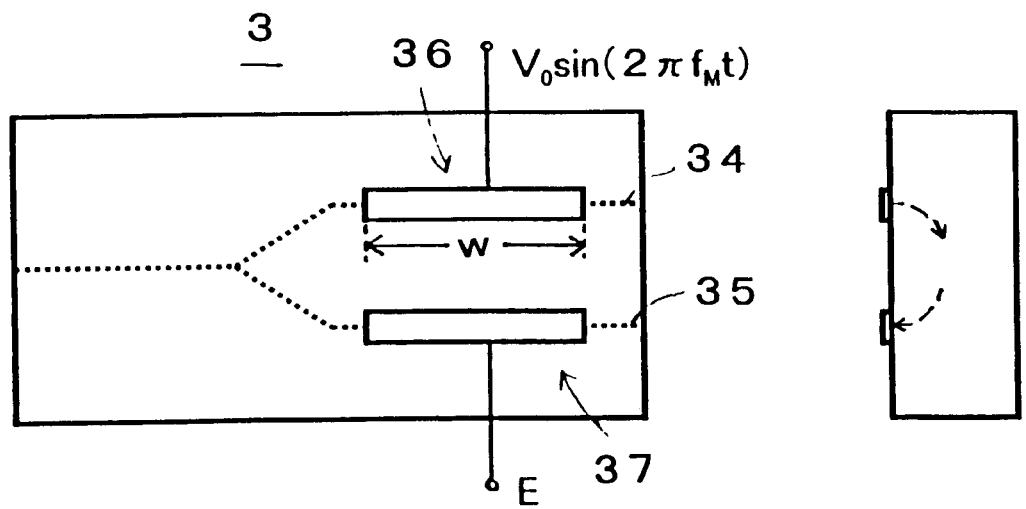

Next, in FIGS. 11A and 11B, the structure of the modification of the light emission portion is illustrated. In FIGS. 11A and 11B, the left drawing is a plan view of the light emission portion, and the right drawing is a sectional view of the portion where the electrode exists.

In FIGS. 10D and 11A, the light emission portion 3 is illustrated, in which the waveguide of a Z or Y-propagation type is formed using the X cut substrate, and the waveguide of a X-propagation type is formed using a Y cut substrate. The phase modulators 36 and 37 shown in FIG. 10D have the individual electrodes. On the other hand, the electrodes formed inside the light emission waveguides 34 and 35 are commonly connected to the ground E and, the electrodes outside the light emission waveguides 34 and 35 are commonly connected to the phase modulation voltage, whereby a voltage having approximately the same amplitude and opposite sign to the phase modulation voltage can be applied to the electrodes of the two phase modulators 36 and 37. FIG. 11A shows the situation that the electrodes inside the light emission waveguides 34 and 35 are commonly formed in consideration for such an electric connection.

Moreover, FIG. 11B shows the light emission portion 3 in which the waveguide of the X or Y-propagation type is formed using the Z cut substrate or the waveguide of the Z-propagation type is formed using the Y cut substrate. This implies that the electrodes of the phase modulators 36 and 37 are formed in the upper portions of the light emission waveguides 34 and 35 and the phase modulation voltage is applied to one and the earth E is connected to the other, whereby approxiamately the same amplitude and opposite sign voltage can be respectively applied to the two phase modulators 36 and 37.

(6) Operation of the Displacement Measurement

Figure 12:
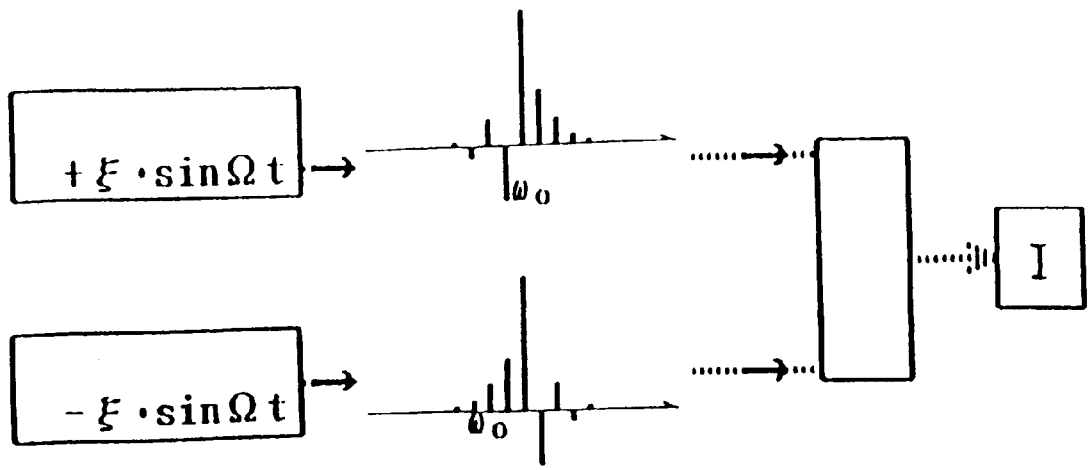
In FIG. 12, an explanatory view concerning an interference of a push-pull type phase modulation method is illustrated.

Next, an operation principle of the displacement measurement by the interference measurement apparatus will be described. In FIG. 12, an explanatory view concerning an interference of a push-pull type phase modulation method is illustrated. Hereinafter, the operation principle will be described corresponding to this drawing.

The modulation operations of the waveguide section 34 (first pass) and the waveguide section 35 (second pass) utilizes the Pockels effect of a $LiNbO_3$ single crystal substrate.

Noted that r denotes a Pockeks effect of the $LiNbO_3$ single crystal substrate; d, an electrode interval of the waveguides; Ω, a modulation angle frequency; V, an application volage; and w, an electrode length of the waveguide.

Therefore, when the following sine wave voltage is applied, the phases of the light in the first and second optical paths are expressed by the following expression.

$$V = V_0 \sin(2\pi \cdot f_M t) = V_0 \sin(\Omega t)$$

$$\phi_1 = \frac{2\pi}{\lambda} n_1 w = \frac{2\pi}{\lambda} w(n_0 + \Delta n) \equiv \phi_0 + \Delta\phi_1$$

$$\phi_2 = \frac{2\pi}{\lambda} n_2 w = \frac{2\pi}{\lambda} w(n_0 - \Delta n) \equiv \phi_0 + \Delta\phi_2$$

Accordingly, the phase changes of the lights in the first and second optical paths are expressed by the following expression.

$$\Delta\phi_1 = -\frac{1}{2} \frac{2\pi}{\lambda} w \cdot n_0^3 r \left(\frac{1}{d}\right) \cdot V_0 \sin(\Omega t) \equiv -\xi\sin(\Omega t)$$

$$\Delta\phi_2 = +\frac{1}{2} \frac{2\pi}{\lambda} w \cdot n_0^3 r \left(\frac{1}{d}\right) \cdot V_0 \sin(\Omega t) \equiv +\xi\sin(\Omega t)$$

As described, it is a feature of the push-pull type phase modulation method that the phase change of the lights in the X and Y-directions are the same amplitude and the opposite sign to each other.

The first diffracted luminous flux U1 which undergoes the phase modulation by passing through the first optical path and is reflected from the diffraction grating type scale of the scale section 5, and the second diffracted luminous flux U2 which undergoes the phase modulation by passing through the second optical path and is reflected from the diffraction grating type scale of the scale section 5, the phase difference $\Delta\Phi = 2\pi\Delta L/p$ due to the displacement amount $\Delta L$ is produced between them, are expressed by the following expression.

$$U_1 = E_1 \exp[-i(\omega_0 t - \phi_0 + \xi\sin\Omega t)]\exp\left[-i2\pi\Delta\frac{L}{p}\right]$$

$$= E_1 \exp[+i\phi_0]\exp\left[-i2\pi\Delta\frac{L}{p}\right]\sum_{n=-\infty}^{n=+\infty} J_n(\xi) \cdot \exp[-i(\omega_0 + n\Omega)t]$$

$$U_2 = E_2 \exp[-i(\omega_0 t - \phi_0 - \xi\sin\Omega t)]\exp\left[+i2\pi\Delta\frac{L}{p}\right]$$

$$= E_2 \exp[+i\phi_0]\exp\left[+i2\pi\Delta\frac{L}{p}\right]\sum_{n=-\infty}^{n=+\infty} J_n(\xi) \cdot \exp[-i(\omega_0 - n\Omega)t]$$

The interference light I is obtained by making these two lights interfere with each other to be synthesized as follows.

$$I = \{U_1 + U_2\}\{U_1 + U_2\}^*$$

When this is calculated, its fundamental wave component $I(\Omega)$ and its double wave component $I(2\Omega)$ are expressed by the following expression, respectively.

$$I(\Omega) = -4 \cdot J_1(2\xi)E_1 E_2 * \sin\left(2 \cdot 2\pi \frac{\Delta L}{p}\right)$$

$$I(2\Omega) = 4 \cdot J_2(2\xi)E_1 E_2 * \cos\left(2 \cdot 2\pi \frac{\Delta L}{p}\right)$$

Accordingly, in the push-pull type phase modulation method, the phase difference for the displacement amount is $\pi/2$, and the direction discrimination function will be available.

Figure 13:
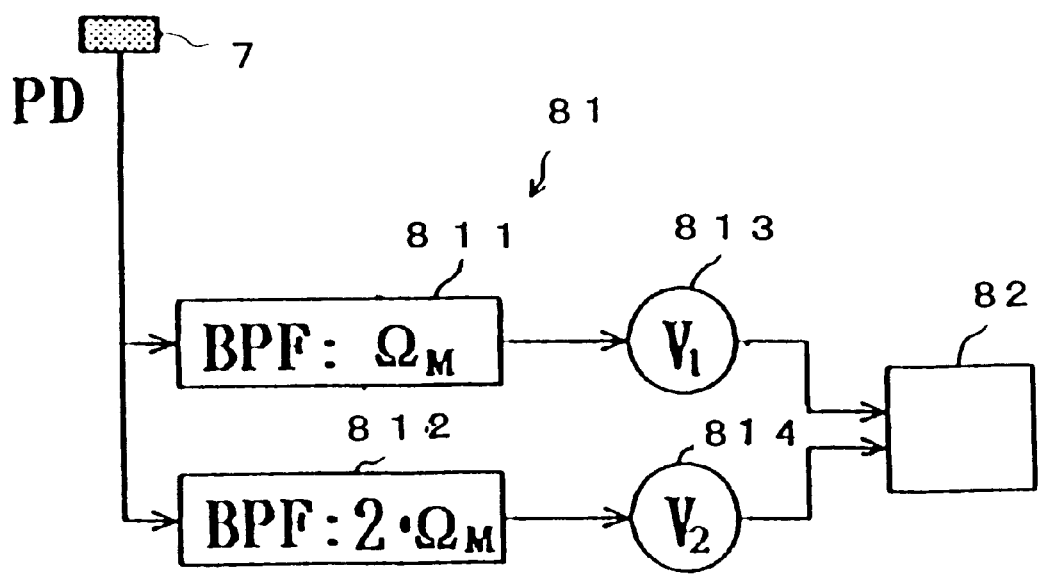
In FIG. 13, a structure of a displacement measurement section is illustrated.

Next, the description is made for the detailed structure of the displacement measurement section. In the displacement measurement section 8, the displacement is measured based on the fundamental wave component $I(\Omega)$ and the double wave component $I(2\Omega)$. In FIG. 13, the constitutional view of the displacement measurement section is illustrated.

The displacement measurement section 8 comprises a signal extraction section 81 and a displacement measuring section 82. The signal extraction section 82 extracts the fundamental wave signal of a frequency equivalent to the modulation frequency of the phase modulation section as well as the double wave signal of a frequency twice that of the modulation frequency, from the output signals of the light receiving section 7. Specifically, the band pass filters 811 and 812 extract the foregoing fundamental wave component $I(\Omega)$ and the double wave component $I(2\Omega)$ by the detection circuits 813 and 814. Moreover, the displacement measuring section 82 obtains the displacement of the measured object from the phase of the signal extracted by the signal extraction section 81, as expressed by the following expression.

$$\Delta L = p/2 \cdot (N + \Delta\Phi/2\pi)$$

where N is an integer, and a count number counted every time the displacement amount varies by $(\frac{1}{2})p$. $\Delta\Phi$ is a wave number of the phase difference within $2\pi$.

Thus, in the displacement measuring section 8, the displacement amount $\Delta L$ of the scale section 5 can be obtained directly from the two kinds of signals. Moreover, by comparing these two kinds of waves, the measuring section 8 can be decide which direction the scale section 5 makes the displacement.

(7) The Other Embodiments

Figure 14:
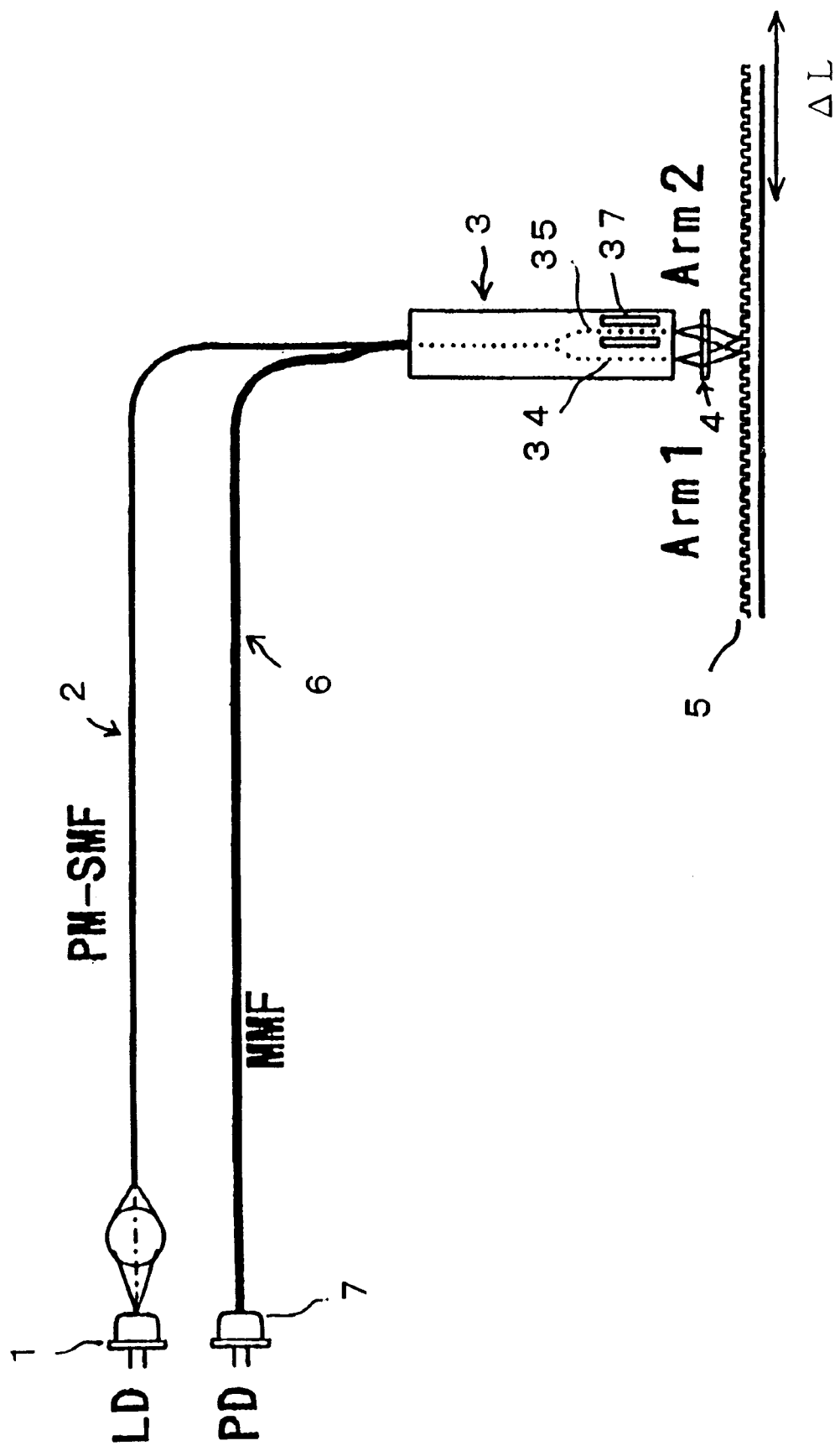
In FIG. 14, a structure of a fourth embodiment of a signal formation apparatus for use in an interference measurement is illustrated.

In FIG. 14, a constitutional view of a fourth embodiment of a signal formation apparatus for use in an interference measurement according to the present invention is illustrated.

In the descriptions of the foregoing embodiments, the examples were described, in which the phase modulators 36 and 37 are provided in both of the light emission waveguides 34 and 35 of the optical substrate 31, respectively. In the fourth embodiment shown in FIG. 14, in the optical substrate 31 of the light emission portion 3, the phase modulator 36 or 37 is provided in one of the light emission waveguides 34 and 35, and the phase modulator is not provided in the other light emission waveguide 34 or 35. Thus, the divided luminous flux divided by the dividing waveguide 33 is emitted from the waveguide as it is, in which no modulator is provided. The two luminous fluxes from the light emission, waveguides 34 and 35 are diffracted by the scale section 5, and received by the light receiving portion 6. Any of the structure in the foregoing embodiments is used for the scale section 5, the light receiving section 6 and the displacement measurement section 8. Noted that the scale section 5 and the light receiving portion 6 are not limited to the reflection type and they may be the transmission type as described in the following fifth embodiment.

Next, an operation principle of the displacement measurement by such a signal formation apparatus for use in an interference measurement will be described. Here, as an example, the case will be described, in which the luminous flux passes through the waveguide section 34 (first optical pass) without being subjected to the phase modulation, and in the waveguide section 35 (second optical pass) the modulation operation is performed by the phase modulator 37.

The first diffracted luminous flux $E_{A1}$ which is reflected from the diffraction grating type scale of the scale section 5 and the second diffracted luminous flux $E_{A2}$ which is reflected from the diffraction grating type scale thereof, the phase difference $\Delta\Phi = 2\pi\Delta L/p$ due to the displacement amount ΔL of a diffracted grating type scale is produced between them, are expressed by the following expression. Noted that each parameter is the same as the above definitions.

$$E_{A1} = E_1 \exp\left[-i\left(\omega_0 t - 2\pi\frac{\Delta L}{p}\right)\right]$$

$$E_{A2} = E_2 \sum_{n=-\infty}^{n=+\infty} J_n(\xi) \cdot \exp\left[-i(\omega_0 - n\Omega)t + 2\pi\frac{\Delta L}{p}\right]$$

The interference light I which is obtained by making these two lights interfere with each other to be synthesized is expressed by the following expression.

$$I = \{E_{A1} + E_{A2}\}\{E_{A1} + E_{A2}\}^*$$

When the calculation is performed for this interference light I, its fundamental wave component I(Ω) and its double wave component I(2Ω) are expressed by the following expressions.

$$I(\Omega) = \left\{4E_{A1}E_{A2} * J_1(\xi) \cdot \sin\left(4\pi\frac{\Delta L}{p}\right)\right\} \times \sin[\Omega t]$$

$$I(2\Omega) = \left\{4E_{A1}E_{A2} * J_2(\xi) \cdot \cos\left(4\pi\frac{\Delta L}{p}\right)\right\} \times \cos[2\Omega t]$$

Figure 15:
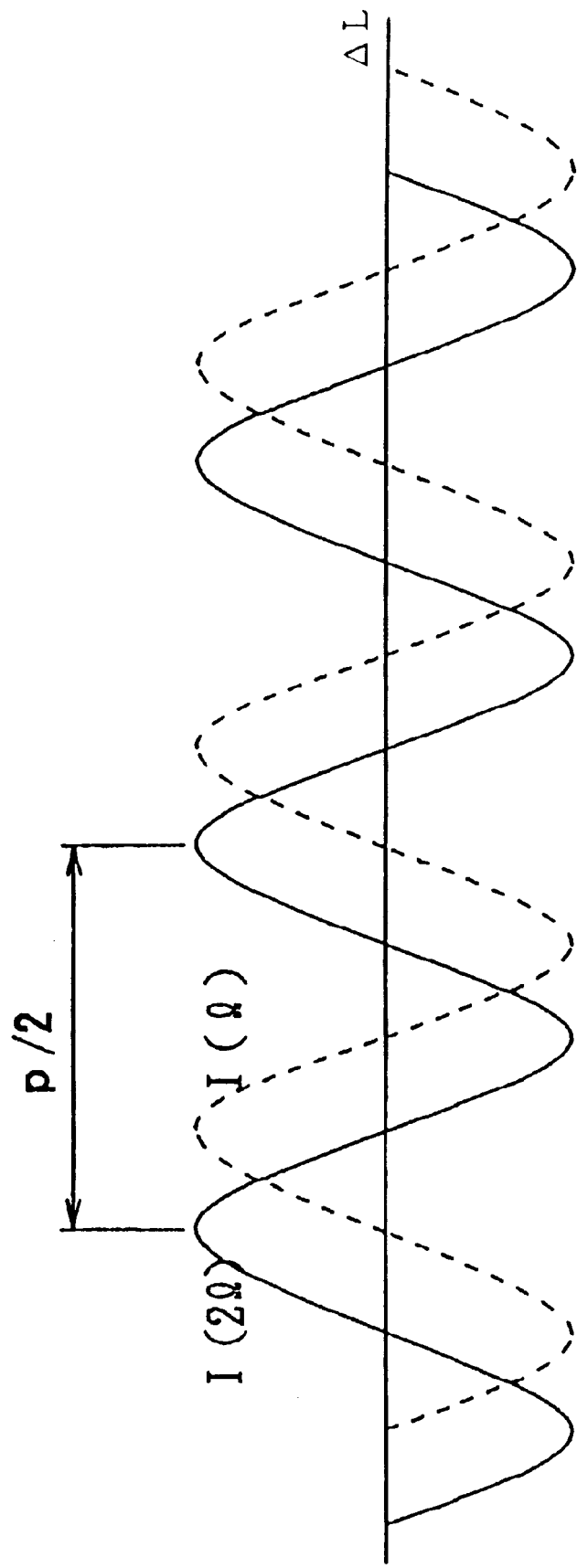
In FIG. 15, waveforms of a basic wave component $I(\Omega)$ and a double wave component $I(2\Omega)$ are illustrated.

In FIG. 15, the waveforms of the fundamental wave component I(Ω) and its double wave component I(2Ω) are shown.

In the displacement measurement section 8, the displacement ΔL of the scale section 5 can be measured based on the fundamental wave component I(Ω) and its double wave component I(2Ω), similarly to the foregoing embodiments.

Figure 16:
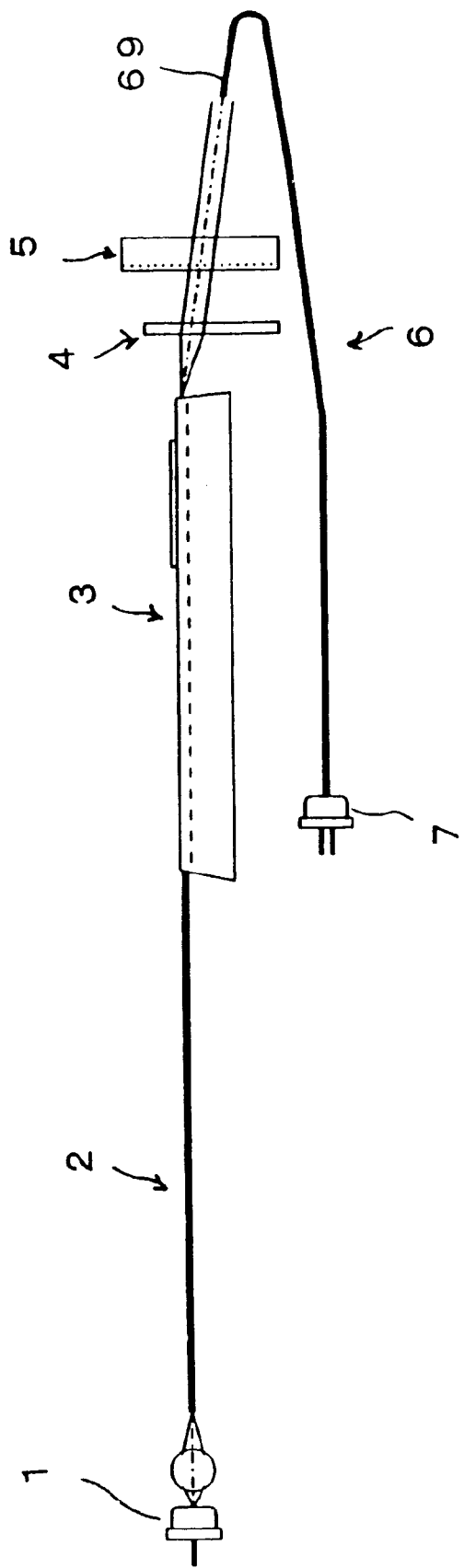
In FIG. 16, a structure of a fifth embodiment of a signal formation apparatus for use inn interference measurement is illustrated.
Figure 17:
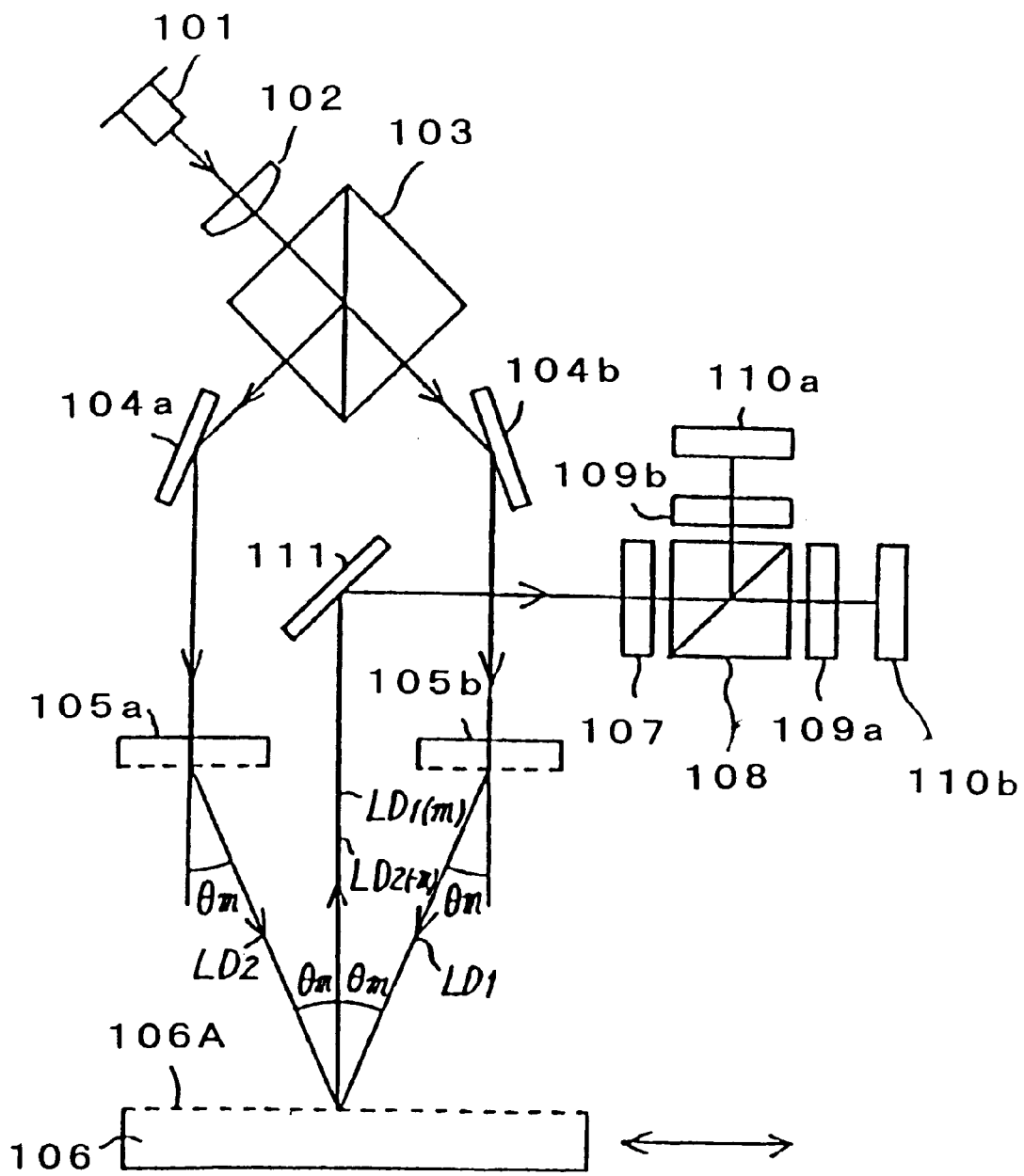
In FIG. 17, a structure of a conventional interference measurement apparatus is illustrated.
Figure 18A:
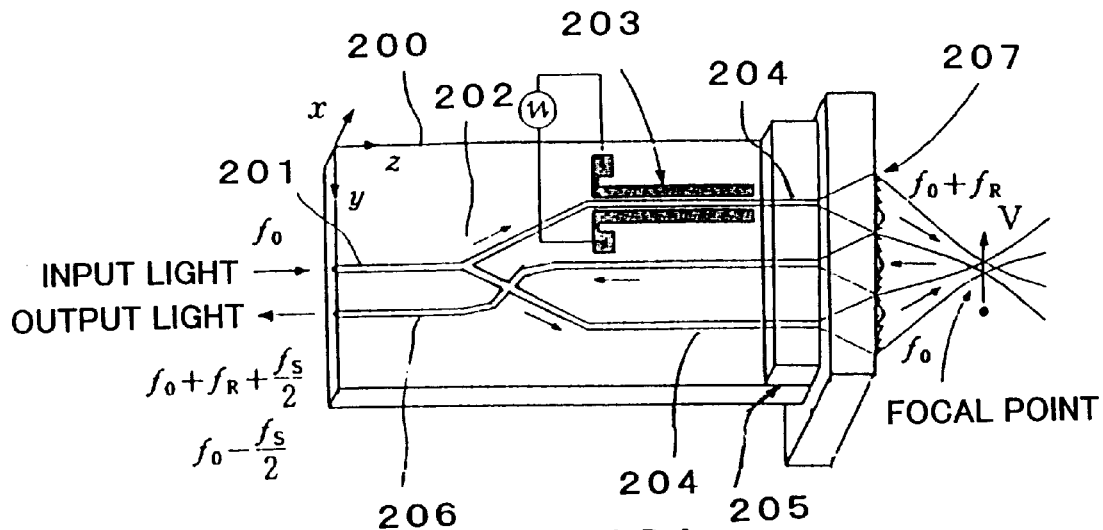
In FIGS. 18A and 18B a structure of a conventional waveguide laser Doppler veloccimeter device is illustrated.
Figure 18B:
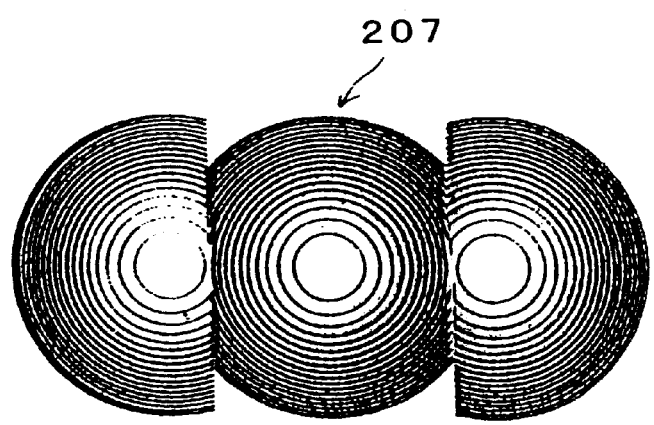

Next, in FIG. 16, a constitutional view of a fifth embodiment of a signal formation apparatus for use in an interference measurement according to the present invention will be described.

In the foregoing embodiments, though the diffracted luminous flux is reflected by the scale 5, the scale 5 is the transmission type in this embodiment, and the diffracted luminous flux is allowed to transmit through the scale 5 in the fifth embodiment. The light receiving portion 6 receives the transmitted diffracted luminous flux by suitably arranging the optical fiber 69 with a block, a ferrule or the like. Noted that the transmitted diffracted luminous flux may be directly incident to the light receiving portion 7 for receiving it without using the optical fiber 69. Moreover, when the light receiving section is provided under the optical substrate, it can be fitted to the optical substrate by suitably setting a reflection mirror while saving a space for it.

What is claimed is:

1. A signal formation apparatus for use in an interference measurement which comprising:
    a light emission portion for forming at least two irradiation luminous fluxes, the light emission portion having an incidence waveguide for guiding a coherent irradiation luminous flux from a light source section; a dividing waveguide for dividing the luminous flux from said incidence waveguide into at least two luminous fluxes; at least two emission waveguides divided by said dividing waveguide; and a phase modulator for performing a phase modulation for a luminous flux of at least one of said emission waveguides, said incidence waveguide, said dividing waveguide, said emission waveguides, and said phase modulator being formed on one surface of an optical substrate; and
    a light receiving portion for receiving a diffracted luminous flux obtained by diffracting and reflecting at least the two luminous fluxes by a scale section, the light receiving portion being formed on the other surface of said optical substrate.

2. The signal formation apparatus for use in an interference measurement according to claim 1, wherein said light receiving portion comprises a block provided on the other surface of the optical substrate; and a multi-mode fiber fixed by said block.

3. The signal formation apparatus for use in an interference measurement according to claim 1, wherein said light receiving portion comprises a waveguide formed on the other surface of the optical substrate.

4. The signal formation apparatus for use in an interference measurement according to claim 1, wherein said light receiving portion comprises a cross finger electrode which is formed on the other surface of the optical substrate and forms a surface acoustic wave.

5. The signal formation apparatus for use in an interference measurement according to claim 4, said apparatus further comprising a plurality of light receiving devices formed on the other surface of the optical substrate, each receiving plural components of said diffracted luminous flux separated by the surface acoustic wave of said cross finger electrode.

6. The signal formation apparatus for use in an interference measurement according to claim 1, said apparatus further comprising:
    an irradiation optical portion irradiating an irradiation luminous flux from an emission end of said emission waveguide to the scale section from a direction which inclines by an angle relative to a normal line to the scale section, by collimating the irradiation luminous flux and deflecting so that at least two irradiation luminous fluxes are superposed on the scale section.

7. The signal formation apparatus for use in an interference measurement according to claim 6, wherein said irradiation optical portion is constituted so that a focal point on a rear side is arranged near an emission end of said emission waveguide and the scale section is arranged near a focal point on a front side.

8. The signal formation apparatus for use in an interference measurement according to claim 6, wherein said irradiation optical portion comprises any of a combination of a diffraction grating and either a ball lens or a lens, and a diffraction type lens such as a Fresnel zone plate.

9. The signal formation apparatus for use in an interference measurement according to claim 6, wherein said irradiation optical portion comprises a diffraction type lens such as a Fresnel zone plate in which an optical axis is approximately located at a central portion of an emission position of at least two luminous fluxes emitted from the optical substrate of said light emission portion.

10. The signal formation apparatus for use in an interference measurement according to claim 9, wherein when a wavelength of said light source section is set to $\gamma_0$, an interval of said two emission waveguides of said optical substrate is set to d, a grating pitch of the scale section is set to p, and a diffraction angle of a principal beam of light by the scale section is set to θ, a condition that a ±1 order diffraction light diffracted by the scale section is reflected vertically from the scale section is as follows, $$\sin \theta = \pm \lambda_0/p,$$

and, a focal length $f_0$ of the diffraction type lens such as a Fresnel zone plate is determined so that the following expression is established, $$f_0 = (d/2) \tan \theta.$$

11. The signal formation apparatus for use in an interference measurement according to claim 1, wherein a light emission side end face of said emission waveguide of said light emission portion and a light incidence side end face of said light receiving portion are formed to be obliquely sloping toward a plane perpendicular to a light emission direction of the irradiation luminous flux or a plane perpendicular to a displacement direction of the scale section, so as to protrude to the scale section toward a center from each surface; and said irradiation luminous flux refracted in the irradiation side end face of said irradiation waveguide is reflected and diffracted by the scale section and then refracted at and incident in an incidence side end face of said light receiving portion.

12. A signal formation apparatus for use in an interference measurement comprising:
   a light emission portion for forming at least two irradiation luminous fluxes, the light emission portion having an incidence waveguide for guiding a coherent irradiation luminous flux from a light source section; a dividing waveguide for dividing the luminous flux from said incidence waveguide into at least two luminous fluxes; at least two emission waveguides divided by said dividing waveguide; and a phase modulator for performing a phase modulation for a luminous flux of at least one of said emission waveguides, said incidence waveguide, said dividing waveguide, said emission waveguides, and said phase modulator being formed on a surface of an optical substrate;
   an irradiation optical portion having a diffraction type lens such as a Fresnel zone plate, said irradiation optical portion irradiating at least two irradiation luminous fluxes irradiated from said light emission portion to a measurement spot;
   a scale section movably disposed relative to said light emission portion, said scale section diffracting at least the two luminous fluxes irradiated by said irradiation optical portion by a diffraction grating formed on a surface thereof, thereby forming a diffracted luminous flux approximately in the same direction as that of the irradiated luminous flux;
   a light receiving portion for receiving the diffracted luminous flux diffracted by said scale section; and
   a light receiving section for receiving the diffracted luminous flux received by said light receiving portion, thereby forming a light receiving signal.

13. The signal formation apparatus for use in an interference measurement according to claim 12, said apparatus further comprising:
   a displacement measurement section for obtaining displacements of said irradiation optical portion and said scale section, based on a light receiving signal generated by said light receiving section.

14. The signal formation apparatus for use in an interference measurement according to claim 12, wherein said light receiving portion is made such that said light receiving portion receives a diffracted luminous flux obtained by reflecting an irradiation luminous flux by said scale section, the irradiation luminous flux being irradiated by said irradiation optical portion.

15. The signal formation apparatus for use in an interference measurement according to claim 12, wherein said light receiving portion is made such that said light receiving portion receives a diffracted luminous flux obtained by allowing an irradiation luminous flux to transmit through said scale section, the irradiation luminous flux being irradiated by said irradiation optical portion.

16. The signal formation apparatus for use in an interference measurement according to claim 12, wherein said irradiation optical portion is made such that a focal position on a rear side is disposed near an irradiation end of said irradiation waveguide and said scale section is disposed near a focal position on a front side.

17. The signal formation apparatus for use in an interference measurement according to claim 12, wherein a diffraction lens of said irradiation optical portion such as a Fresnel zone plate is disposed such that an optical axis is positioned approximately coincident with a central portion of irradiation positions of at least two luminous fluxes emitted from an optical substrate of said light emission portion.

18. The signal formation apparatus for use in an interference measurement according to claim 17, wherein when a wavelength of said light source section is set to $\lambda_0$, an interval of said two emission waveguides of said optical substrate is set to d, a grating pitch of the scale section is set to p, and a diffraction angle of a principal beam of light by the scale section is set to $\theta$, a condition that a $\pm 1$ order diffraction light diffracted by the scale section is reflected vertically from the scale section is as follows, $$\sin \theta = \pm \lambda_0 / p,$$

and, a focal length $f_0$ of the diffraction type lens such as a Fresnel zone plate is determined so that the following expression is established, $$f_0 = (d/2) \tan \theta.$$

19. The signal formation apparatus for use in an interference measurement according to claim 12, wherein a light emission side end face of said emission waveguide of said light emission portion and a light incidence side end face of said light receiving portion are formed to be obliquely sloping toward a plane perpendicular to a light emission direction of the irradiation luminous flux or a plane perpendicular to a displacement direction of the scale section, so as to protrude to said scale section toward a center from each surface; and said irradiation luminous flux refracted in the irradiation side end face of said irradiation waveguide is reflected and diffracted by the scale section and then refracted and incident in an incidence side end face of said light receiving portion.

20. A signal formation apparatus for use in an interference measurement comprising:
   a light emission portion for forming at least two irradiation luminous fluxes, the light emission portion having an incidence waveguide for guiding a coherent irradiation luminous flux from a light source section; a dividing waveguide for dividing the luminous flux from said incidence waveguide into at least two luminous fluxes; at least two emission waveguides divided by said dividing waveguide; and a phase modulator for performing a phase modulation for a luminous flux of at least one of said emission waveguides, said incidence waveguide, said dividing waveguide, said emission waveguides, and said phase modulator being formed on a surface of an optical substrate; and a light receiving portion for receiving a diffracted luminous flux, said diffracted luminous flux being obtained by diffracting, reflecting or transmitting at least the two irradiation luminous fluxes irradiated by said light emission portion in a movable scale section having a diffraction grating.

* * * * *